(12) United States Patent
Deng

(10) Patent No.: US 10,187,176 B2
(45) Date of Patent: Jan. 22, 2019

(54) METHOD, APPARATUS, AND DEVICE FOR MODULATING ORTHOGONAL FREQUENCY DIVISION MULTIPLEXING OPTICAL SIGNAL

(71) Applicant: Huawei Technologies Co., Ltd., Shenzhen, Guangdong (CN)

(72) Inventor: Ning Deng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/375,813

(22) Filed: Dec. 12, 2016

(65) Prior Publication Data
US 2017/0093519 A1 Mar. 30, 2017

Related U.S. Application Data

(63) Continuation of application No. PCT/CN2014/079867, filed on Jun. 13, 2014.

(51) Int. Cl.
*H04J 14/02* (2006.01)
*H04B 10/548* (2013.01)
*H04L 27/26* (2006.01)
*H04L 5/00* (2006.01)

(52) U.S. Cl.
CPC ........ *H04J 14/0298* (2013.01); *H04B 10/548* (2013.01); *H04L 5/0048* (2013.01); *H04L 27/26* (2013.01); *H04L 27/2613* (2013.01)

(58) Field of Classification Search
CPC ............................ H04J 14/0298; H04B 10/548
See application file for complete search history.

(56) References Cited

U.S. PATENT DOCUMENTS 5,513,029 A 4/1996 Roberts
7,693,429 B1 * 4/2010 Lowery ............... H04B 10/548
398/182

(Continued)

FOREIGN PATENT DOCUMENTS

CN 1579063 A 2/2005
CN 101005475 A 7/2007
(Continued)

OTHER PUBLICATIONS

Shouyin Liu et al.,"Channel Estimation Using Frequency-domain Superimposed Pilot Time-Domain Correlation Method for OFDM Systems" Communication Technology, Nov. 1, 2006, 4 pages, XP031071841.
(Continued)

*Primary Examiner* — Nathan M Cors

(57) ABSTRACT

A method, an apparatus, and a device for modulating an orthogonal frequency division multiplexing optical signal are provided and relate to the field of optical communications technologies. The method includes: performing bit-to-symbol mapping and serial-to-parallel conversion on a baseband signal to obtain at least two sub symbol sequences of the baseband signal; determining, from all subcarriers of an OFDM signal, a subcarrier used for loading a pilot signal; updating, according to information of the pilot signal, content corresponding to the subcarrier used for loading the pilot signal; and performing inverse discrete Fourier transform, parallel-to-serial conversion, digital-to-analog conversion, and electrical amplification processing on content currently corresponding to all the subcarriers of the OFDM signal, and modulating a light wave by using processed data and a bias electrical signal, to form an OFDM optical signal loaded with the pilot signal.

16 Claims, 16 Drawing Sheets

(56) References Cited

U.S. PATENT DOCUMENTS

| | | | | |
|---|---|---|---|---|
| 2004/0131011 | A1* | 7/2004 | Sandell | H04L 1/0618 370/210 |
| 2009/0052470 | A1* | 2/2009 | Yun | H04L 5/0016 370/491 |
| 2010/0159914 | A1* | 6/2010 | Ancora | H04L 5/0048 455/422.1 |
| 2012/0148261 | A1* | 6/2012 | Yu | H04B 10/548 398/193 |
| 2012/0155887 | A1 | 6/2012 | Youn et al. | |
| 2014/0056583 | A1* | 2/2014 | Giddings | H04L 27/2663 398/44 |
| 2015/0078267 | A1* | 3/2015 | Cheng | H04L 27/2636 370/329 |

FOREIGN PATENT DOCUMENTS

| | | |
|---|---|---|
| CN | 101047683 A | 10/2007 |
| CN | 101217316 A | 7/2008 |
| CN | 101371547 A | 2/2009 |
| CN | 101572683 A | 11/2009 |
| CN | 102546506 A | 7/2012 |
| JP | 2012085059 A | 4/2012 |

OTHER PUBLICATIONS

Lanlan He et al., "Superimposed Training-Based Channel Estimation and Data Detection for OFDM Amplify-and-Forward Cooperative Systems Under High Mobility", IEEE Transactions on Signal Processing, vol. 60, No. 1, Jan. 1, 2012, 11 pages, XP011389744.

Jun Kyoung Lee et al.,"Performances of the superimposition schemes for OFDM systems", Oct. 14, 2008, 14th Asia-Pacific Conference on Communications, Oct. 14, 2008, 5 pages, XP031418060.

Daofeng Xu et al.,"Channel Estimation for OFDM Systems using Superimposed training", The First IEEE and IFIP International Conference in Central Asia on Bishkek, Sep. 26, 2005, 5 pages, XP010896383.

* cited by examiner

METHOD, APPARATUS, AND DEVICE FOR MODULATING ORTHOGONAL FREQUENCY DIVISION MULTIPLEXING OPTICAL SIGNAL

CROSS-REFERENCE TO RELATED APPLICATIONS

This application is a continuation of International Application No. PCT/CN2014/079867, filed on Jun. 13, 2014, the disclosure of which is hereby incorporated by reference in its entirety.

TECHNICAL FIELD

The present disclosure relates to the field of optical communications technologies, and in particular, to a method, an apparatus, and a device for modulating an orthogonal frequency division multiplexing optical signal.

BACKGROUND

In optical communication, a pilot signal is a function signal that is loaded on a high-rate data optical signal and used for a function such as supervision, control, equalization, synchronization, or reference. For an Orthogonal Frequency Division Multiplexing (OFDM) optical signal including a plurality of subcarriers, a pilot signal may be loaded on the OFDM optical signal in a process of forming the OFDM optical signal. In design of an OFDM optical signal, a quantity of subcarriers in the OFDM optical signal is determined according to a specific situation of a baseband signal, and before the OFDM optical signal is formed, which subcarriers in all subcarriers of the OFDM optical signals are used for loading which baseband signals are predetermined.

In the prior art, during modulation of an OFDM optical signal, in a case in which not all subcarriers are loaded with baseband signals, subcarriers that are not loaded with baseband signals are used for loading pilot signals. A specific process is as follows: First, in the OFDM optical signal, a subcarrier used for loading a pilot signal is determined from all the subcarriers that are not loaded with baseband signals, and bit-to-symbol mapping is performed on a baseband signal to map a bit sequence of the baseband signal to a symbol sequence; then serial-to-parallel conversion is performed on the symbol sequence of the baseband signal to divide the symbol sequence of the baseband signal into groups according to a quantity of values included in each symbol and obtain a plurality of sub symbol sequences, where each sub symbol sequence corresponds to a subcarrier for loading the symbol sequence; and for the subcarrier used for loading the pilot signal, a sub symbol sequence corresponding to the subcarrier is set to a constant value. Then Inverse Discrete Fourier Transform (IDFT) is performed on each group of sub symbol sequences corresponding to the baseband signal and the pilot signal, so that values of the sub symbol sequences in a frequency domain are transformed to a time domain. Then a cyclic prefix is inserted in the sub symbol sequences in the time domain, and parallel-to-serial conversion is performed to obtain a service signal time domain sequence that is formed by all the sub symbol sequences and loaded on all the subcarriers. Then clipping and digital-to-analog conversion are performed, an OFDM electrical signal loaded with the pilot signal is formed, and electrical amplification is performed on the OFDM electrical signal loaded with the pilot signal. Finally, the OFDM electrical signal loaded with the pilot signal and a light wave are modulated into an OFDM optical signal loaded with the pilot signal.

During implementation of the present invention, the inventor finds that the prior art has at least the following problem:

In a case in which not all subcarriers are loaded with baseband signals, when subcarriers that are not loaded with baseband signals are used for loading pilot signals, a quantity of remaining subcarriers that are not loaded with baseband signals is limited. Therefore, a quantity of pilot signals to be loaded is generally greater than a quantity of subcarriers that are not loaded with baseband signals, and an implementation environment of the prior art is limited. Consequently, the pilot signal loading manner provided by the prior art has a certain limitation.

SUMMARY

To solve the problem of the prior art, embodiments of the present invention provide a method, an apparatus, and a device for modulating an orthogonal frequency division multiplexing optical signal. The technical solutions are as follows:

According to a first aspect, a method for modulating an orthogonal frequency division multiplexing optical signal is provided, where the method includes:

performing bit-to-symbol mapping on a baseband signal to obtain a symbol sequence of the baseband signal;

performing serial-to-parallel conversion on the symbol sequence to obtain at least two sub symbol sequences of the baseband signal, where each sub symbol sequence of the baseband signal corresponds to one subcarrier of an OFDM signal;

determining, from all subcarriers of the OFDM signal, a subcarrier used for loading a pilot signal;

updating, according to information of the pilot signal, content corresponding to the subcarrier used for loading the pilot signal; and performing inverse discrete Fourier transform, parallel-to-serial conversion, digital-to-analog conversion, and electrical amplification processing on content currently corresponding to all the subcarriers of the OFDM signal, and modulating a light wave by using processed data and a bias electrical signal, to form an OFDM optical signal loaded with the pilot signal.

With reference to the first aspect, in a first possible implementation manner of the first aspect, the updating, according to information of the pilot signal, content corresponding to the subcarrier used for loading the pilot signal includes:

determining a symbol sequence of the pilot signal according to the information of the pilot signal, where the symbol sequence of the pilot signal is a discrete periodic sequence; and if the content corresponding to the subcarrier used for loading the pilot signal includes a sub symbol sequence of the baseband signal, replacing the sub symbol sequence of the baseband signal with the symbol sequence of the pilot signal, or superimposing the symbol sequence of the pilot signal on the sub symbol sequence of the baseband signal.

With reference to the first possible implementation manner of the first aspect, in a second possible implementation manner of the first aspect, the determining a symbol sequence of the pilot signal according to the information of the pilot signal includes:

determining a frequency of the pilot signal according to the information of the pilot signal, and determining a frequency of the subcarrier used for loading the pilot signal; and determining the symbol sequence of the pilot signal according to a relationship between the frequency of the pilot signal and the frequency of the subcarrier used for loading the pilot signal.

With reference to the second possible implementation manner of the first aspect, in a third possible implementation manner of the first aspect, the determining the symbol sequence of the pilot signal according to a relationship between the frequency of the pilot signal and the frequency of the subcarrier used for loading the pilot signal includes:

if the frequency of the pilot signal is higher than the frequency of the subcarrier used for loading the pilot signal, determining a symbol sequence obtained by performing Hilbert transform on the pilot signal as the symbol sequence of the pilot signal; or if the frequency of the pilot signal is lower than the frequency of the subcarrier used for loading the pilot signal, determining a conjugate sequence of a symbol sequence obtained by performing Hilbert transform on the pilot signal as the symbol sequence of the pilot signal; or if the frequency of the pilot signal is equal to the frequency of the subcarrier used for loading the pilot signal, determining a preset constant sequence as the symbol sequence of the pilot signal.

With reference to the first aspect, the first possible implementation manner of the first aspect, the second possible implementation manner of the first aspect, or the third possible implementation manner of the first aspect, in a fourth possible implementation manner of the first aspect, the pilot signal is a periodic signal formed by superimposition of at least two periodic signals, and a high-order harmonic wave component of the periodic signal formed by superimposition of the at least two periodic signals is smaller than a high-order harmonic wave component of any periodic signal in the at least two periodic signals.

With reference to the fourth possible implementation manner of the first aspect, in a fifth possible implementation manner of the first aspect, the at least two periodic signals are a square wave signal and a triangular wave signal respectively.

According to a second aspect, a method for modulating an orthogonal frequency division multiplexing optical signal is provided, where the method includes:

performing bit-to-symbol mapping on a baseband signal to obtain a symbol sequence of the baseband signal;

performing serial-to-parallel conversion on the symbol sequence to obtain at least two sub symbol sequences of the baseband signal, where each sub symbol sequence of the baseband signal corresponds to one subcarrier of an OFDM signal;

performing inverse discrete Fourier transform and parallel-to-serial conversion on all the sub symbol sequences of the baseband signal to obtain a service signal time domain sequence of the baseband signal;

determining, from all subcarriers of the OFDM signal, a subcarrier used for loading a pilot signal;

updating, according to information of the pilot signal, content corresponding to the subcarrier used for loading the pilot signal; and performing digital-to-analog conversion and electrical amplification processing on content currently corresponding to all the subcarriers of the OFDM signal, and modulating a light wave by using processed data and a bias electrical signal, to form an OFDM optical signal loaded with the pilot signal.

With reference to the second aspect, in a first possible implementation manner of the second aspect, the updating, according to information of the pilot signal, content corresponding to the subcarrier used for loading the pilot signal includes:

determining a waveform value sequence of the pilot signal according to the information of the pilot signal; and if the content corresponding to the subcarrier used for loading the pilot signal includes the service signal time domain sequence of the baseband signal, superimposing the waveform value sequence of the pilot signal on the service signal time domain sequence; or obtaining a product of the service signal time domain sequence and the waveform value sequence of the pilot signal, obtaining a loaded sequence, and superimposing the loaded sequence on the service signal time domain sequence.

With reference to the second aspect or the first possible implementation manner of the second aspect, in a second possible implementation manner of the second aspect, the pilot signal is a periodic signal formed by superimposition of at least two periodic signals, and a high-order harmonic wave component of the periodic signal formed by superimposition of the at least two periodic signals is smaller than a high-order harmonic wave component of any periodic signal in the at least two periodic signals.

With reference to the second possible implementation manner of the second aspect, in a third possible implementation manner of the second aspect, the at least two periodic signals are a square wave signal and a triangular wave signal.

According to a third aspect, an apparatus for modulating an orthogonal frequency division multiplexing optical signal is provided, where the apparatus includes:

a bit-to-symbol mapping module, configured to perform bit-to-symbol mapping on a baseband signal to obtain a symbol sequence of the baseband signal;

a serial-to-parallel conversion module, configured to perform serial-to-parallel conversion on the symbol sequence obtained by the bit-to-symbol mapping module to obtain at least two sub symbol sequences of the baseband signal, where each sub symbol sequence of the baseband signal corresponds to one subcarrier of an OFDM signal;

a determining module, configured to determine, from all subcarriers of the OFDM signal, a subcarrier used for loading a pilot signal;

a first updating module, configured to update, according to information of the pilot signal, content corresponding to the subcarrier that is used for loading the pilot signal and determined by the determining module;

an inverse discrete Fourier transform module, configured to perform inverse discrete Fourier transform on content currently corresponding to all the subcarriers of the OFDM signal;

a parallel-to-serial conversion module, configured to perform parallel-to-serial conversion on data processed by the inverse discrete Fourier transform module;

a digital-to-analog conversion module, configured to perform digital-to-analog conversion on data processed by the parallel-to-serial conversion module;

an electrical amplification module, configured to perform electrical amplification processing on data processed by the digital-to-analog conversion module; and a modulation module, configured to modulate data processed by the electrical amplification module with a bias electrical signal and a light wave, to form an OFDM optical signal loaded with the pilot signal.

With reference to the third aspect, in a first possible implementation manner of the third aspect, the first updating module includes:

a first determining unit, configured to determine a symbol sequence of the pilot signal according to the information of the pilot signal, where the symbol sequence of the pilot signal is a discrete periodic sequence; and a first updating unit, configured to: when the content corresponding to the subcarrier used for loading the pilot signal includes a sub symbol sequence of the baseband signal, replace the sub symbol sequence of the baseband signal with the symbol sequence of the pilot signal that is determined by the first determining unit, or superimpose, on the sub symbol sequence of the baseband signal, the symbol sequence of the pilot signal that is determined by the first determining unit.

With reference to the first possible implementation manner of the third aspect, in a second possible implementation manner of the third aspect, the first determining unit includes:

a first determining subunit, configured to determine a frequency of the pilot signal according to the information of the pilot signal, and determine a frequency of the subcarrier used for loading the pilot signal; and a second determining subunit, configured to determine the symbol sequence of the pilot signal according to a relationship between the frequency of the pilot signal and the frequency of the subcarrier used for loading the pilot signal that are determined by the first determining subunit.

With reference to the second possible implementation manner of the third aspect, in a third possible implementation manner of the third aspect, the second determining subunit is configured to determine a symbol sequence obtained by performing Hilbert transform on the pilot signal as the symbol sequence of the pilot signal when the frequency of the pilot signal is higher than the frequency of the subcarrier used for loading the pilot signal; or the second determining subunit is configured to determine a conjugate sequence of a symbol sequence obtained by performing Hilbert transform on the pilot signal as the symbol sequence of the pilot signal when the frequency of the pilot signal is lower than the frequency of the subcarrier used for loading the pilot signal; or the second determining subunit is configured to determine a preset constant sequence as the symbol sequence of the pilot signal when the frequency of the pilot signal is equal to the frequency of the subcarrier used for loading the pilot signal.

With reference to the third aspect, the first possible implementation manner of the third aspect, the second possible implementation manner of the third aspect, or the third possible implementation manner of the third aspect, in a fourth possible implementation manner of the third aspect, the pilot signal is a periodic signal formed by superimposition of at least two periodic signals, and a high-order harmonic wave component of the periodic signal formed by superimposition of the at least two periodic signals is smaller than a high-order harmonic wave component of any periodic signal in the at least two periodic signals.

With reference to the fourth possible implementation manner of the third aspect, in a fifth possible implementation manner of the third aspect, the at least two periodic signals are a square wave signal and a triangular wave signal respectively.

According to a fourth aspect, an apparatus for modulating an orthogonal frequency division multiplexing optical signal is provided, where the apparatus includes:

a bit-to-symbol mapping module, configured to perform bit-to-symbol mapping on a baseband signal to obtain a symbol sequence of the baseband signal;

a serial-to-parallel conversion module, configured to perform serial-to-parallel conversion on the symbol sequence obtained by the bit-to-symbol mapping module to obtain at least two sub symbol sequences of the baseband signal, where each sub symbol sequence of the baseband signal corresponds to one subcarrier of an OFDM signal;

an inverse discrete Fourier transform module, configured to perform inverse discrete Fourier transform on all the sub symbol sequences of the baseband signal;

a parallel-to-serial conversion module, configured to perform parallel-to-serial conversion on data processed by the inverse discrete Fourier transform module to obtain a service signal time domain sequence of the baseband signal;

a determining module, configured to determine, from all subcarriers of the OFDM signal, a subcarrier used for loading a pilot signal;

a second updating module, configured to update, according to information of the pilot signal, content corresponding to the subcarrier that is used for loading the pilot signal and determined by the determining module;

a digital-to-analog conversion module, configured to perform digital-to-analog conversion on content currently corresponding to all the subcarriers of the OFDM signal;

an electrical amplification module, configured to perform electrical amplification processing on data processed by the digital-to-analog conversion module; and a modulation module, configured to modulate data processed by the electrical amplification module with a bias electrical signal and a light wave, to form an OFDM optical signal loaded with the pilot signal.

With reference to the fourth aspect, in a first possible implementation manner of the fourth aspect, the second updating module includes:

a second determining unit, configured to determine a waveform value sequence of the pilot signal according to the information of the pilot signal; and a second updating unit, configured to: when the content corresponding to the subcarrier used for loading the pilot signal includes the service signal time domain sequence of the baseband signal, superimpose, on the service signal time domain sequence, the waveform value sequence of the pilot signal that is determined by the second determining unit; or obtain a product of the service signal time domain sequence and the waveform value sequence of the pilot signal that is determined by the second determining unit, obtain a loaded sequence, and superimpose the loaded sequence on the service signal time domain sequence.

With reference to the fourth aspect or the first possible implementation manner of the fourth aspect, in a second possible implementation manner of the fourth aspect, the pilot signal is a periodic signal formed by superimposition of at least two periodic signals, and a high-order harmonic wave component of the periodic signal formed by superimposition of the at least two periodic signals is smaller than a high-order harmonic wave component of any periodic signal in the at least two periodic signals.

With reference to the second possible implementation manner of the fourth aspect, in a third possible implementation manner of the fourth aspect, the at least two periodic signals are a square wave signal and a triangular wave signal.

According to a fifth aspect, a device for modulating an orthogonal frequency division multiplexing optical signal is provided, where the device includes a first digital signal processor, a digital-to-analog converter, an electrical amplifier, and a modulator, where the first digital signal processor is configured to: perform bit-to-symbol mapping on a baseband signal to obtain a symbol sequence of the baseband signal; perform serial-to-parallel conversion on the symbol sequence to obtain at least two sub symbol sequences of the baseband signal, where each sub symbol sequence of the baseband signal corresponds to one subcarrier of an OFDM signal; determine, from all subcarriers of the OFDM signal, a subcarrier used for loading a pilot signal; update, according to information of the pilot signal, content corresponding to the subcarrier used for loading the pilot signal; and perform inverse discrete Fourier transform and parallel-to-serial conversion on content currently corresponding to all the subcarriers of the OFDM signal;

the digital-to-analog converter is configured to perform digital-to-analog conversion on data processed by the first digital signal processor;

the electrical amplifier is configured to perform electrical amplification processing on data processed by the digital-to-analog converter; and the modulator is configured to modulate data processed by the electrical amplifier with a bias electrical signal and a light wave, to form an OFDM optical signal loaded with the pilot signal.

With reference to the fifth aspect, in a first possible implementation manner of the fifth aspect, the first digital signal processor is configured to: determine a symbol sequence of the pilot signal according to the information of the pilot signal, where the symbol sequence of the pilot signal is a discrete periodic sequence; and when the content corresponding to the subcarrier used for loading the pilot signal includes a sub symbol sequence of the baseband signal, replace the sub symbol sequence of the baseband signal with the symbol sequence of the pilot signal, or superimpose the symbol sequence of the pilot signal on the sub symbol sequence of the baseband signal.

With reference to the first possible implementation manner of the fifth aspect, in a second possible implementation manner of the fifth aspect, the first digital signal processor is configured to: determine a frequency of the pilot signal according to the information of the pilot signal, and determine a frequency of the subcarrier used for loading the pilot signal; and determine the symbol sequence of the pilot signal according to a relationship between the frequency of the pilot signal and the frequency of the subcarrier used for loading the pilot signal.

With reference to the second possible implementation manner of the fifth aspect, in a third possible implementation manner of the fifth aspect, the first digital signal processor is configured to determine a symbol sequence obtained by performing Hilbert transform on the pilot signal as the symbol sequence of the pilot signal when the frequency of the pilot signal is higher than the frequency of the subcarrier used for loading the pilot signal; or the first digital signal processor is configured to determine a conjugate sequence of a symbol sequence obtained by performing Hilbert transform on the pilot signal as the symbol sequence of the pilot signal when the frequency of the pilot signal is lower than the frequency of the subcarrier used for loading the pilot signal; or the first digital signal processor is configured to determine a preset constant sequence as the symbol sequence of the pilot signal when the frequency of the pilot signal is equal to the frequency of the subcarrier used for loading the pilot signal.

With reference to the fifth aspect, the first possible implementation manner of the fifth aspect, the second possible implementation manner of the fifth aspect, or the third possible implementation manner of the fifth aspect, in a fourth possible implementation manner of the fifth aspect, the pilot signal is a periodic signal formed by superimposition of at least two periodic signals, and a high-order harmonic wave component of the periodic signal formed by superimposition of the at least two periodic signals is smaller than a high-order harmonic wave component of any periodic signal in the at least two periodic signals.

With reference to the fourth possible implementation manner of the fifth aspect, in a fifth possible implementation manner of the fifth aspect, the at least two periodic signals are a square wave signal and a triangular wave signal respectively.

According to a sixth aspect, a device for modulating an orthogonal frequency division multiplexing optical signal is provided, where the device includes a second digital signal processor, a digital-to-analog converter, an electrical amplifier, and a modulator, where the second digital signal processor is configured to: perform bit-to-symbol mapping on a baseband signal to obtain a symbol sequence of the baseband signal; perform serial-to-parallel conversion on the symbol sequence to obtain at least two sub symbol sequences of the baseband signal, where each sub symbol sequence of the baseband signal corresponds to one subcarrier of an OFDM signal; perform inverse discrete Fourier transform and parallel-to-serial conversion on all the sub symbol sequences of the baseband signal to obtain a service signal time domain sequence of the baseband signal; determine, from all subcarriers of the OFDM signal, a subcarrier used for loading a pilot signal; and update, according to information of the pilot signal, content corresponding to the subcarrier used for loading the pilot signal;

the digital-to-analog converter is configured to perform digital-to-analog conversion on data processed by the second digital signal processor;

the electrical amplifier is configured to perform electrical amplification processing on data processed by the digital-to-analog converter; and the modulator is configured to modulate data processed by the electrical amplifier with a bias electrical signal and a light wave, to form an OFDM optical signal loaded with the pilot signal.

With reference to the sixth aspect, in a first possible implementation manner of the sixth aspect, the second digital signal processor is configured to: determine a waveform value sequence of the pilot signal according to the information of the pilot signal; and when the content corresponding to the subcarrier used for loading the pilot signal includes the service signal time domain sequence of the baseband signal, superimpose the waveform value sequence of the pilot signal on the service signal time domain sequence; or obtain a product of the service signal time domain sequence and the waveform value sequence of the pilot signal, obtain a loaded sequence, and superimpose the loaded sequence on the service signal time domain sequence.

With reference to the sixth aspect or the first possible implementation manner of the sixth aspect, in a second possible implementation manner of the sixth aspect, the pilot signal is a periodic signal formed by superimposition of at least two periodic signals, and a high-order harmonic wave component of the periodic signal formed by superimposition of the at least two periodic signals is smaller than a high-order harmonic wave component of any periodic signal in the at least two periodic signals.

With reference to the second possible implementation manner of the sixth aspect, in a third possible implementation manner of the sixth aspect, the at least two periodic signals are a square wave signal and a triangular wave signal.

The technical solutions provided by the embodiments of the present invention have the following advantageous effects:

After bit-to-symbol mapping and serial-to-parallel conversion are performed on a baseband signal, or after bit-to-symbol mapping, serial-to-parallel conversion, inverse discrete Fourier transform, and parallel-to-serial conversion are performed on a baseband signal, content corresponding to a subcarrier that is used for loading a pilot signal and determined from all subcarriers of an OFDM signal is updated according to information of the pilot signal, and further, an OFDM optical signal loaded with the pilot signal is formed. In this way, pilot signals may be loaded on all subcarriers of an OFDM optical signal, a quantity of subcarriers loaded with pilot signals is increased, and further, a quantity of pilot signals loaded on the OFDM optical signal is increased.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings.

In a case in which not all subcarriers are loaded with baseband signals, when subcarriers that are not loaded with baseband signals are used for loading pilot signals, a quantity of remaining subcarriers that are not loaded with baseband signals is limited. Therefore, a quantity of pilot signals to be loaded is generally greater than a quantity of subcarriers that are not loaded with baseband signals, and an implementation environment of the prior art is limited. To increase the quantity of subcarriers loaded with pilot signals, an embodiment of the present invention provides a method for modulating an orthogonal frequency division multiplexing optical signal.

Figure 1:
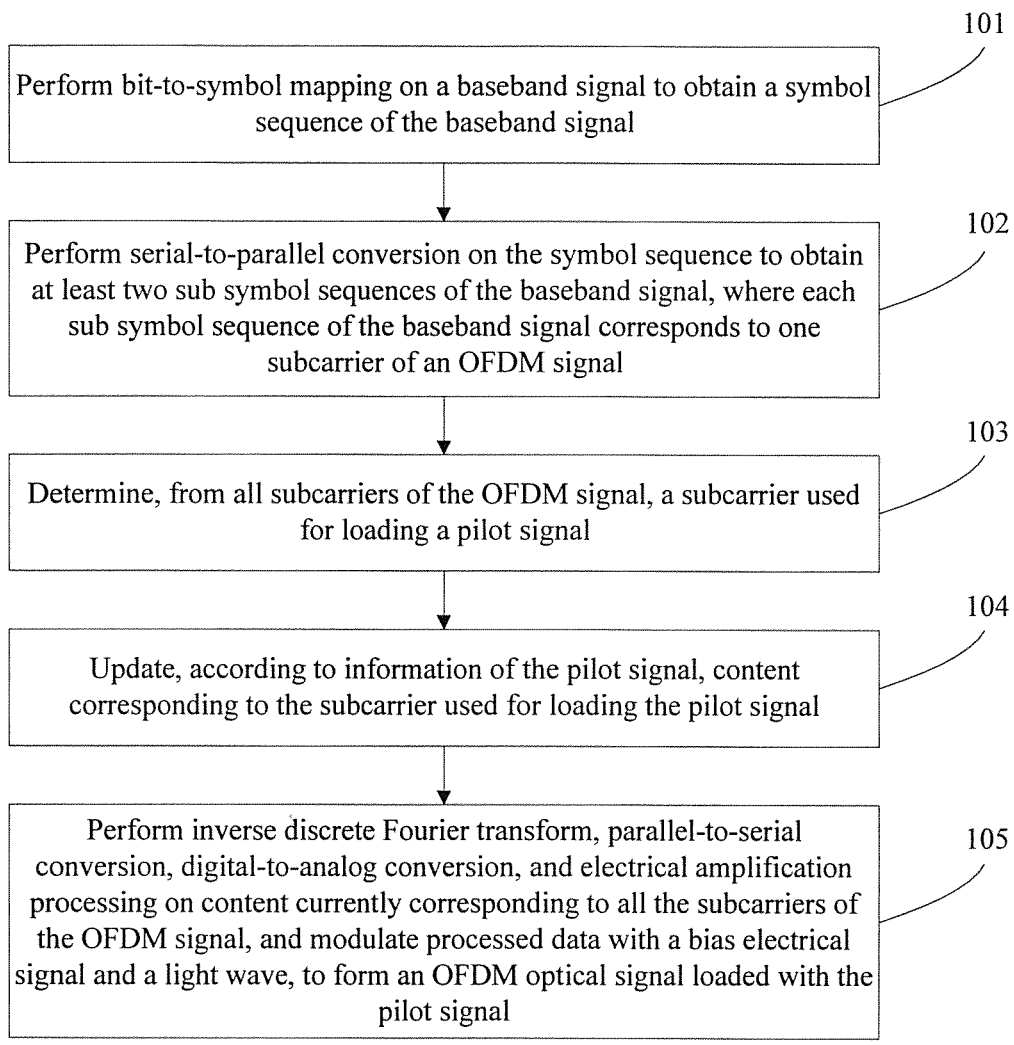
FIG. 1 is a flowchart of a method for modulating an orthogonal frequency division multiplexing optical signal according to an embodiment of the present invention.

With reference to the foregoing implementation environment, this embodiment provides a method for modulating an orthogonal frequency division multiplexing optical signal. Referring to FIG. 1, a procedure of the method provided by this embodiment is specifically as follows:

101. Perform bit-to-symbol mapping on a baseband signal to obtain a symbol sequence of the baseband signal.

102. Perform serial-to-parallel conversion on the symbol sequence to obtain at least two sub symbol sequences of the baseband signal, where each sub symbol sequence of the baseband signal corresponds to one subcarrier of an OFDM signal.

103. Determine, from all subcarriers of the OFDM signal, a subcarrier used for loading a pilot signal.

104. Update, according to information of the pilot signal, content corresponding to the subcarrier used for loading the pilot signal.

Optionally, the updating, according to information of the pilot signal, content corresponding to the subcarrier used for loading the pilot signal includes:

determining a symbol sequence of the pilot signal according to the information of the pilot signal, where the symbol sequence of the pilot signal is a discrete periodic sequence; and if the content corresponding to the subcarrier used for loading the pilot signal includes a sub symbol sequence of the baseband signal, replacing the sub symbol sequence of the baseband signal with the symbol sequence of the pilot signal, or superimposing the symbol sequence of the pilot signal on the sub symbol sequence of the baseband signal.

Optionally, the determining a symbol sequence of the pilot signal according to the information of the pilot signal includes:

determining a frequency of the pilot signal according to the information of the pilot signal, and determining a frequency of the subcarrier used for loading the pilot signal; and determining the symbol sequence of the pilot signal according to a relationship between the frequency of the pilot signal and the frequency of the subcarrier used for loading the pilot signal.

Optionally, the determining the symbol sequence of the pilot signal according to a relationship between the frequency of the pilot signal and the frequency of the subcarrier used for loading the pilot signal includes:

if the frequency of the pilot signal is higher than the frequency of the subcarrier used for loading the pilot signal, determining a symbol sequence obtained by performing Hilbert transform on the pilot signal as the symbol sequence of the pilot signal; or if the frequency of the pilot signal is lower than the frequency of the subcarrier used for loading the pilot signal, determining a conjugate sequence of a symbol sequence obtained by performing Hilbert transform on the pilot signal as the symbol sequence of the pilot signal; or if the frequency of the pilot signal is equal to the frequency of the subcarrier used for loading the pilot signal, determining a preset constant sequence as the symbol sequence of the pilot signal.

105. Perform inverse discrete Fourier transform, parallel-to-serial conversion, digital-to-analog conversion, and electrical amplification processing on content currently corresponding to all the subcarriers of the OFDM signal, and modulate a light wave by using processed data and a bias electrical signal, to form an OFDM optical signal loaded with the pilot signal.

Optionally, the pilot signal is a periodic signal formed by superimposition of at least two periodic signals, and a high-order harmonic wave component of the periodic signal formed by superimposition of the at least two periodic signals is smaller than a high-order harmonic wave component of any periodic signal in the at least two periodic signals.

Optionally, the at least two periodic signals are a square wave signal and a triangular wave signal respectively.

According to the method provided by this embodiment, after bit-to-symbol mapping and serial-to-parallel conversion are performed on a baseband signal, content corresponding to a subcarrier that is used for loading a pilot signal and determined from all subcarriers of an OFDM signal is updated according to information of the pilot signal, and further, an OFDM optical signal loaded with the pilot signal is formed. In this way, pilot signals may be loaded on all subcarriers of an OFDM optical signal, a quantity of subcarriers loaded with pilot signals is increased, and further, a quantity of pilot signals loaded on the OFDM optical signal is increased.

Another embodiment of the present invention provides a method for modulating an orthogonal frequency division multiplexing optical signal. With reference to content of the embodiment shown in FIG. 1, referring to FIG. 2, a procedure of the method provided by this embodiment includes:

201. Perform bit-to-symbol mapping on a baseband signal to obtain a symbol sequence of the baseband signal.

A specific method for performing bit-to-symbol mapping on the baseband signal to obtain the symbol sequence of the baseband signal is not limited in this embodiment. For details, reference may be made to a conventional bit-to-symbol mapping manner.

202. Perform serial-to-parallel conversion on the symbol sequence to obtain at least two sub symbol sequences of the baseband signal, where each sub symbol sequence of the baseband signal corresponds to one subcarrier of an OFDM signal.

A specific method for performing serial-to-parallel conversion on the symbol sequence obtained by performing bit-to-symbol mapping on the baseband signal to obtain the at least two sub symbol sequences of the baseband signal is not limited in this embodiment. For details, reference may be made to a conventional serial-to-parallel conversion manner. Because which subcarrier of the OFDM signal is used for loading the baseband signal may be predetermined, after the sub symbol sequences of the baseband signal are obtained, each sub symbol sequence of the baseband signal may correspond to a subcarrier of the OFDM signal.

203. Obtain information of a pilot signal.

The pilot signal is a periodic signal. A specific periodic signal used as a pilot signal is not limited in this embodiment. The specific periodic signal includes but is not limited to: the specific periodic signal used as the pilot signal is a sine function, or a function after a sine function is phase-shifted, for example, a cosine function.

The information of the pilot signal is a frequency of the periodic signal, or other information. Specific information of the pilot signal is not limited in this embodiment.

In addition, in specific implementation of the method provided by this embodiment, if implementation of the sine function is relatively complex, lots of computing resources or storage resources or other resources need to be consumed. In this case, the specific periodic signal used as the pilot signal may also be other periodic functions such as a square wave or a triangular wave.

However, a harmonic wave amplitude of another periodic function may be relatively high. In specific implementation, a high harmonic wave amplitude causes pilot crosstalk or causes a plurality of harmonic wave components to extend to a spectrum of the baseband signal, resulting in certain degradation of performance of the baseband signal. To reduce the harmonic wave amplitude of another periodic function, the specific periodic signal used as the pilot signal may also be a periodic signal formed by superimposition of at least two periodic signals. Compared with the sine function, implementation of the periodic signal formed by superimposition of at least two periodic signals is simplified greatly, a harmonic wave component is very small, and performance is very near to performance of using the sine function. Optionally, the at least two periodic signals that are superimposed are a square wave signal and a triangular wave signal. Optionally, a high-order harmonic wave component of the periodic signal formed by superimposition of the at least two periodic signals is smaller than a high-order harmonic wave component of any periodic signal in the at least two periodic signals.

For example, the specific periodic signal used as the pilot signal is a periodic signal formed by superimposition of a square wave and a triangular wave by using the following formula according to a superimposition coefficient $1.5\pi/(1.5\pi+1)$ of the triangular wave and a superimposition coefficient $1/(1.5\pi+1)$ of the square wave:

Periodic signal 1 after superimposition=$1.5\pi/(1.5\pi+1)$×Triangular wave+$1/(1.5\pi+1)$×Square wave Certainly, the superimposition coefficient of the triangular wave and the superimposition coefficient of the square wave during superimposition may also be other values. The specific superimposition coefficient of the triangular wave and the specific superimposition coefficient of the square wave are not limited in this embodiment.

Figure 3:
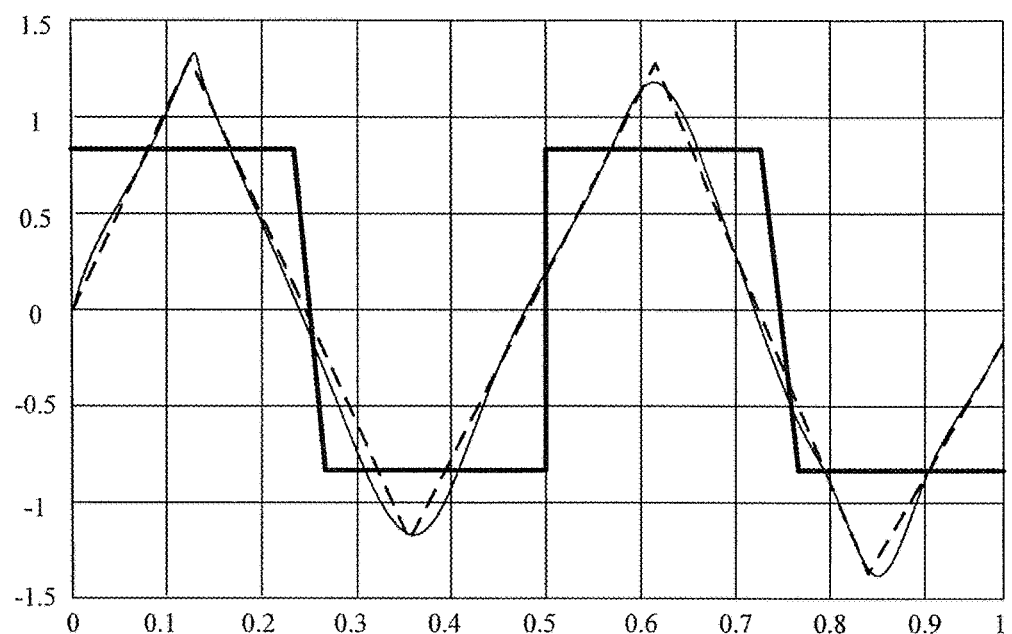
FIG. 3 is a schematic diagram of a time domain waveform of a square wave, a triangular wave, and a periodic signal 1 after superimposition according to another embodiment of the present invention.
Figure 4:
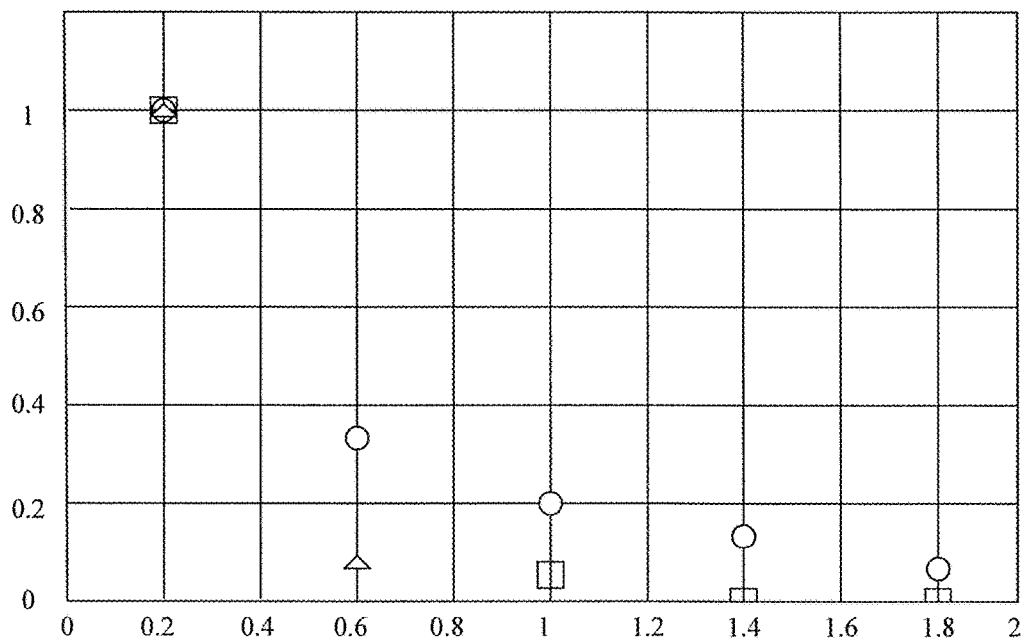
FIG. 4 is a schematic diagram of a spectrum of a square wave, a triangular wave, and a periodic signal 1 after superimposition according to another embodiment of the present invention.

Reference may be made to FIG. 3 showing a diagram of a time domain waveform of the square wave (thick solid line), the triangular wave (dashed line), and the periodic signal 1 (thin solid line) after superimposition and FIG. 4 showing a diagram of a spectrum of the square wave (square), the triangular wave (triangular), and the periodic signal 1 (circular) after superimposition. A unit of a horizontal coordinate in FIG. 3 is $10^{-6}$, and a unit of a horizontal coordinate in FIG. 4 is $10^7$. As can be known from FIG. 3 and FIG. 4, three harmonic waves of the periodic signal 1 after superimposition are completely canceled, and other harmonic waves of the periodic signal 1 after superimposition are partially canceled. On the whole, harmonic waves of the periodic signal 1 after superimposition are far lower than the triangular wave or square wave with the same amplitude.

204. Determine, from all subcarriers of the OFDM signal, a subcarrier used for loading the pilot signal.

A specific method for determining, from all the subcarriers of the OFDM signal, the subcarrier used for loading the pilot signal, is not limited in this embodiment. To increase a quantity of subcarriers that are loaded with pilot signals, the method provided by this embodiment may determine, from all the subcarriers of the OFDM signal, subcarriers used for loading pilot signals. For example, if a pilot signal loading apparatus pre-knows a subcarrier used for loading a pilot signal, the pre-known subcarrier used for loading the pilot signal is obtained. For another example, it is determined that all the subcarriers of the OFDM signal are subcarriers used for loading pilot signals. For a case in which the determined subcarrier used for loading the pilot signal corresponds to a sub symbol sequence of the baseband signal, the method provided by this embodiment provides a specific loading manner in subsequent steps. For details, reference may be made to the subsequent steps.

205. Update, according to the information of the pilot signal, content corresponding to the subcarrier used for loading the pilot signal.

A specific method for updating, according to the information of the pilot signal, the content corresponding to the subcarrier used for loading the pilot signal, is not limited in this embodiment. Referring to a schematic diagram of an implementation environment shown in FIG. 5, after serial-to-parallel conversion is performed on the symbol sequence of the baseband signal to obtain the at least two sub symbol sequences of the baseband signal, each sub symbol sequence of the baseband signal corresponds to a subcarrier of the OFDM signal. In addition, before the baseband signal is loaded, a subcarrier used for loading the baseband signal is already determined from the subcarriers of the OFDM signal. Therefore, after the foregoing step 202, which subcarriers correspond to sub symbol sequences of the baseband signal and which subcarriers do not correspond to sub symbol sequences of the baseband signal can be determined. That is, content corresponding to some subcarriers of the OFDM signal includes a sub symbol sequence of the baseband signal, and content corresponding to some subcarriers of the OFDM signal does not include a sub symbol sequence of the baseband signal. Based on this, after the subcarrier used for loading the pilot signal is determined from the subcarriers of the OFDM signal in step 204, considering a case in which content corresponding to some subcarriers of the OFDM signal includes a sub symbol sequence of the baseband signal, the content corresponding to the subcarrier used for loading the pilot signal may be updated according to the information of the pilot signal. A specific updating process includes but is not limited to the following two steps.

Step 1: Determine a symbol sequence of the pilot signal according to the information of the pilot signal, where the symbol sequence of the pilot signal is a discrete periodic sequence.

A specific method for determining the symbol sequence of the pilot signal according to the information of the pilot signal is not specifically limited in this embodiment. The specific method includes but is not limited to: determining sampling values of the pilot signal according to the information of the pilot signal, and determining a sequence formed by the sampling values of the pilot signal as the symbol sequence of the pilot signal.

For example, the obtained information of the pilot signal is that a frequency of the pilot signal is $f_p$. An intrinsic position $f_m$, of an $m^{th}$ subcarrier nearest to $f_p$ on an optical spectrum, namely, an original position of the $m^{th}$ subcarrier on the spectrum after the OFDM optical signal carrying no pilot signal is generated, is determined according to $f_p$. F is determined according to a formula $f_p=f_m\pm\Delta f_{sc}\times F$. A specific form of the pilot signal is constructed according to F: Sine signal $g=\sin(2\pi\times F)$, and it is determined that a sequence $g(k)=\sin(2\pi\times F\times k)$ formed by sampling values of $g=\sin(2\pi\times F)$ is a discrete periodic sequence corresponding to the pilot signal. $\Delta f_{sc}$ is a spacing between subcarriers of the OFDM optical signal, and $g(k)$ is a $k^{th}$ sampling value.

In addition to the method for determining the symbol sequence of the pilot signal according to the information of the pilot signal, a specific method for determining the symbol sequence of the pilot signal according to the information of the pilot signal may also be: determining the frequency of the pilot signal according to the information of the pilot signal, and determining a frequency of the subcarrier used for loading the pilot signal; and determining the symbol sequence of the pilot signal according to a relationship between the frequency of the pilot signal and the frequency of the subcarrier used for loading the pilot signal.

For the step of determining the frequency of the pilot signal according to the information of the pilot signal, the frequency of the pilot signal may be further determined according to the information of the pilot signal in another manner. A specific manner of determining the frequency of the pilot signal according to the information of the pilot signal is not limited in this embodiment.

For the step of determining the frequency of the subcarrier used for loading the pilot signal, if the pilot signal loading apparatus pre-knows the frequency of the subcarrier used for loading the pilot signal, the pre-known frequency of the subcarrier used for loading the pilot signal is obtained. In addition, other manners may be used to determine the frequency of the subcarrier used for loading the pilot signal. A specific manner of determining the frequency of the subcarrier used for loading the pilot signal is not limited in this embodiment.

For the step of determining the symbol sequence of the pilot signal according to the relationship between the frequency of the pilot signal and the frequency of the subcarrier used for loading the pilot signal, in specific implementation, if the frequency of the pilot signal is higher than the frequency of the subcarrier used for loading the pilot signal, a symbol sequence obtained by performing Hilbert transform on the pilot signal is determined as the symbol sequence of the pilot signal. If the frequency of the pilot signal is lower than the frequency of the subcarrier used for loading the pilot signal, a conjugate sequence of a symbol sequence obtained by performing Hilbert transform on the pilot signal is determined as the symbol sequence of the pilot signal. If the frequency of the pilot signal is equal to the frequency of the subcarrier used for loading the pilot signal, a preset constant sequence is determined as the symbol sequence of the pilot signal.

For example, the information of the pilot signal is that the frequency of the pilot signal is $f_p$, the pilot signal is $g=\sin(2\pi \times F)$, the frequency of the subcarrier used for loading the pilot signal is $f_s$, and the preset constant sequence is $C(1)$. It can be known from the information of the pilot signal that the frequency of the pilot signal is $f_p$. If $f_p > f_s$, Hilbert transform $A \times \text{hilbert}(\sin(2\pi \times F))$ is performed on the pilot signal, and a symbol sequence $A \times \text{hilbert}(\sin(2\pi \times F) \times k)$ obtained according to $A \times \text{hilbert}(\sin(2\pi \times F))$ is determined as the symbol sequence of the pilot signal. If Hilbert transform $A \times \text{hilbert}(\sin(2\pi \times F))$ is performed on the pilot signal, and a conjugate sequence $\text{conj}(A \times \text{hilbert}(\sin(2\pi \times F) \times k))$ of the symbol sequence $A \times \text{hilbert}(\sin(2\pi \times F) \times k)$ obtained according to $A \times \text{hilbert}(\sin(2\pi \times F))$ is determined as the symbol sequence of the pilot signal. If $f_p = f_s$, the preset constant sequence $C(1)$ is determined as the symbol sequence of the pilot signal.

A is an amplitude, hilbert( ) indicates Hilbert transform, and conj( ) indicates conjugate. A is determined according to an amplitude of the pilot signal, or determined according to a modulation depth of the pilot signal. A specific manner of determining A is not limited in this embodiment.

Step 2: If the content corresponding to the subcarrier used for loading the pilot signal includes a sub symbol sequence of the baseband signal, replace the sub symbol sequence of the baseband signal with the symbol sequence of the pilot signal, or superimpose the symbol sequence of the pilot signal on the sub symbol sequence of the baseband signal.

After serial-to-parallel conversion is performed on the symbol sequence of the baseband signal to obtain the at least two sub symbol sequences of the baseband signal, each sub symbol sequence of the baseband signal corresponds to a subcarrier of the OFDM signal. Therefore, content corresponding to some subcarriers of the OFDM signal includes a sub symbol sequence of the baseband signal, and content corresponding to some subcarriers of the OFDM signal does not include a sub symbol sequence of the baseband signal. That is, if a subcarrier corresponding to a sub symbol sequence of the baseband signal is the same as the subcarrier for loading the pilot signal, a case may exist in which content corresponding to a same subcarrier of the OFDM signal includes both the sub symbol sequence of the baseband signal and the symbol sequence of the pilot signal. Therefore, the method provided by this embodiment uses the following two manners of updating content corresponding to the subcarrier for loading the pilot signal.

Manner 1: Replace the sub symbol sequence of the baseband signal with the symbol sequence of the pilot signal.

For example, there are three sub symbol sequences obtained by performing serial-to-parallel conversion on the baseband signal, which are a sub symbol sequence 1, a sub symbol sequence 2, and a sub symbol sequence 3 respectively, and there are two pilot signals, which are a pilot signal 1 and a pilot signal 2 respectively, where a symbol sequence of the pilot signal 1 is a symbol sequence A1, a symbol sequence of the pilot signal 2 is a symbol sequence A2, content corresponding to a subcarrier used for loading the pilot signal 1 includes the sub symbol sequence 2 of the baseband signal, and content corresponding to a subcarrier used for loading the pilot signal 2 includes the sub symbol sequence 3 of the baseband signal. The sub symbol sequence 2 is modified to the symbol sequence A1, and the sub symbol sequence 3 is modified to the symbol sequence A2. That is, content currently corresponding to the subcarrier used for loading the pilot signal 1 is the symbol sequence A1 of the pilot signal 1, and content currently corresponding to the subcarrier used for loading the pilot signal 2 is the symbol sequence A2 of the pilot signal 2.

For the foregoing manner 1, content currently corresponding to some subcarriers of the OFDM signal includes a sub symbol sequence of the baseband signal, content currently corresponding to some subcarriers of the OFDM signal includes both a sub symbol sequence of the baseband signal and the symbol sequence of the pilot signal, and content currently corresponding to some subcarriers of the OFDM signal includes neither a sub symbol sequence of the baseband signal nor the symbol sequence of the pilot signal.

Manner 2: Superimpose the symbol sequence of the pilot signal on the sub symbol sequence of the baseband signal.

For example, there are three sub symbol sequences obtained by performing serial-to-parallel conversion on the baseband signal, which are a sub symbol sequence 1, a sub symbol sequence 2, and a sub symbol sequence 3 respectively, and there are two pilot signals, which are a pilot signal 1 and a pilot signal 2 respectively, where a symbol sequence of the pilot signal 1 is a symbol sequence A1, a symbol sequence of the pilot signal 2 is a symbol sequence A2, content corresponding to a subcarrier used for loading the pilot signal 1 includes the sub symbol sequence 2 of the baseband signal, and content corresponding to a subcarrier used for loading the pilot signal 2 includes the sub symbol sequence 3 of the baseband signal. The symbol sequence A1 is superimposed on the symbol sequence 2 to obtain a symbol sequence B1, and the symbol sequence A2 is superimposed on the sub symbol sequence 3 to obtain a symbol sequence B2. That is, content currently corresponding to the subcarrier used for loading the pilot signal 1 is the symbol sequence B1, and content currently corresponding to the subcarrier used for loading the pilot signal 2 is the symbol sequence B2 of the pilot signal 2.

For the foregoing manner 2, content currently corresponding to some subcarriers of the OFDM signal includes a sub symbol sequence of the baseband signal, content currently corresponding to some subcarriers of the OFDM signal includes a symbol sequence obtained after the symbol sequence of the pilot signal is superimposed on a sub symbol sequence of the baseband signal, and content currently corresponding to some subcarriers of the OFDM signal includes neither a sub symbol sequence of the baseband signal nor a symbol sequence obtained after the symbol sequence of the pilot signal is superimposed on a sub symbol sequence of the baseband signal.

Certainly, a quantity of sub symbol sequences obtained by performing serial-to-parallel conversion on the baseband signal may also be another quantity, a name of a sub symbol sequence may also be another name, a quantity of pilot signals may also be another quantity, a name of the symbol sequence of the pilot signal may also be another name, and a name of a symbol sequence obtained after the symbol sequence is superimposed on a sub symbol sequence may also be another name. A specific quantity of sub symbol sequences obtained by performing serial-to-parallel conversion on the baseband signal, a specific name of a sub symbol sequence, a specific quantity of pilot signals, a specific name of the symbol sequence of the pilot signal, and a specific name of a symbol sequence obtained after the symbol sequence is superimposed on a sub symbol sequence are not limited in this embodiment.

It should be noted that, in the foregoing description, the manner of loading the pilot signal only in a case in which the content corresponding to the subcarrier used for loading the pilot signal includes a sub symbol sequence of the baseband signal is described. In a case in which the content corresponding to the subcarrier used for loading the pilot signal does not include a sub symbol sequence of the baseband signal, the pilot signal may be loaded according to a conventional pilot signal loading manner, which is not specifically limited in this embodiment.

For example, there are three sub symbol sequences obtained by performing serial-to-parallel conversion on the baseband signal, which are a sub symbol sequence 1, a sub symbol sequence 2, and a sub symbol sequence 3 respectively, and there are two pilot signals, which are a pilot signal 1 and a pilot signal 2 respectively, where a symbol sequence of the pilot signal 1 is a symbol sequence A1, a symbol sequence of the pilot signal 2 is a symbol sequence A2, and neither content corresponding to a subcarrier used for loading the pilot signal 1 nor content of a subcarrier used for loading the pilot signal 2 includes a sub symbol sequence of the baseband signal. Subsequent steps may be performed to load the sub symbol sequence 1, the sub symbol sequence 2, the sub symbol sequence 3, the symbol sequence A1, and the symbol sequence A2 on corresponding subcarriers respectively.

206. Perform inverse discrete Fourier transform, parallel-to-serial conversion, digital-to-analog conversion, and electrical amplification processing on content currently corresponding to all the subcarriers of the OFDM signal, and modulate a light wave by using processed data and a bias electrical signal, to form an OFDM optical signal loaded with the pilot signal.

For this step, if the content corresponding to the subcarrier used for loading the pilot signal includes a sub symbol sequence of the baseband signal, for the manner 1 in the foregoing step 205, because the content corresponding to the subcarrier used for loading the pilot signal is updated by using the manner of replacing the sub symbol sequence of the baseband signal with the symbol sequence of the pilot signal, the content currently corresponding to the subcarrier used for loading the pilot signal includes the symbol sequence of the pilot signal but does not include the sub symbol sequences of the baseband signal. Content currently corresponding to other subcarriers not used for loading the pilot signal may include a sub symbol sequence of the baseband signal, or may not include a sub symbol sequence of the baseband signal. For the manner 2 in the foregoing step 205, because the content corresponding to the subcarrier used for loading the pilot signal is updated by using the manner of superimposing the symbol sequence of the pilot signal on the sub symbol sequence of the baseband signal, the content currently corresponding to the subcarrier used for loading the pilot signal includes the symbol sequence obtained after the symbol sequence of the pilot signal is superposed on the sub symbol sequence of the baseband signal. Content currently corresponding to other subcarriers not used for loading the pilot signal may include a sub symbol sequence of the baseband signal, or may not include a sub symbol sequence of the baseband signal.

Figure 5:
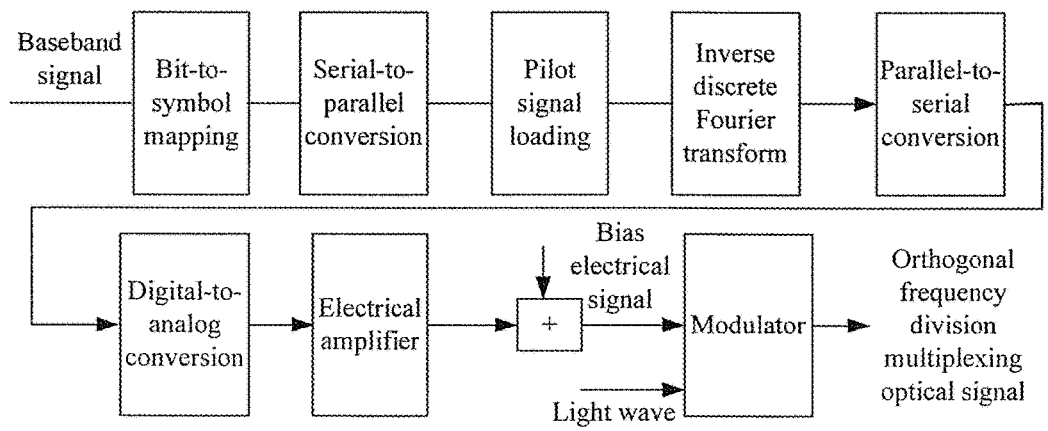
FIG. 5 is a schematic diagram of an implementation environment of a method for modulating an orthogonal frequency division multiplexing optical signal according to another embodiment of the present invention.

No matter what is included in the content currently corresponding to each subcarrier of the OFDM signal, after the content corresponding to the subcarrier used for loading the pilot signal is updated according to the information of the pilot signal, as shown in FIG. 5, in the method provided by this embodiment, inverse discrete Fourier transform, parallel-to-serial conversion, digital-to-analog conversion, and electrical amplification processing are performed on the content currently corresponding to all the subcarriers of the OFDM signal, and the processed data is modulated with the bias electrical signal and the light wave, to form the OFDM optical signal loaded with the pilot signal. Manners of performing inverse discrete Fourier transform, parallel-to-serial conversion, digital-to-analog conversion, and electrical amplification processing on the content currently corresponding to all the subcarriers of the OFDM signal, and modulating the processed data with the bias electrical signal and the light wave are not specifically limited in this embodiment. In specific implementation, a conventional processing manner may be used.

Optionally, after inverse discrete Fourier transform is performed on the content currently corresponding to all the subcarriers of the OFDM signal, values of the content currently corresponding to all the subcarriers of the OFDM signal in a frequency domain are transformed to values in a time domain. In addition, a cyclic prefix may be further inserted in data after inverse discrete Fourier transform processing, and parallel-to-serial conversion is performed on data in which the cyclic prefix is inserted. To fully use a quantization bit width of digital-to-analog conversion, clipping processing may be performed on data after parallel-to-serial conversion, so that the values in the time domain are limited within a certain value range. Afterward, digital-to-analog conversion and electrical amplification processing are performed on data after clipping processing, and finally, the processed data is modulated with the bias electrical signal and the light wave, to form the OFDM optical signal loaded with the pilot signal. Manners of inserting the cyclic prefix and clipping are not specifically limited in this embodiment, and in specific implementation, inserting and clipping may be performed according to an actual situation.

Figure 6:
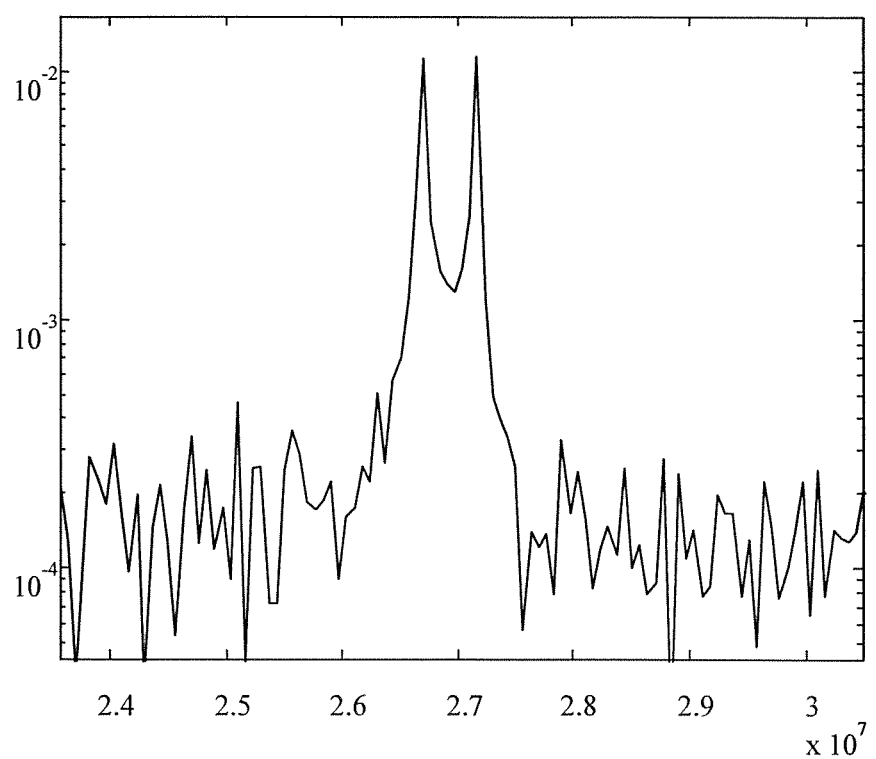
FIG. 6 is a schematic diagram of a first optical spectrum after a pilot signal is loaded according to another embodiment of the present invention.

It should be noted that, if a specific implementation method for determining the symbol sequence of the pilot signal according to the information of the pilot signal is determining the sequence formed by the sampling values of the pilot signal as the symbol sequence of the pilot signal, because $f_p = f_m \pm \Delta f_{sc} \times F$, after the symbol sequence of the pilot signal is loaded on a corresponding subcarrier, two pilots may be generated in a position of $f_p$ on the optical spectrum, as shown in FIG. 6. A dashed line is the position of $f_p$, and a unit of a horizontal coordinate is $10^7$.

For example, the OFDM optical signal occupies a width 28 GHz (gigahertz) of the optical spectrum in total, and there are 1000 subcarriers. If an intrinsic position of a first subcarrier in the 1000 subcarriers is at 0 Hz (hertz), an intrinsic position of a second subcarrier in the 1000 subcarriers is at 28 MHz (megahertz). When $F=0.5\times10^6$, two pilots may be generated at 28±0.5 MHz.

Certainly, the width of the optical spectrum occupied by the OFDM optical signal in total may also be another width, a quantity of subcarriers of the OFDM optical signal may also be another quantity, the intrinsic position of the first subcarrier may also be another position, and F may also be another numeric value. A specific width of the optical spectrum occupied by the OFDM optical signal in total, a specific quantity of subcarriers of the OFDM optical signal, a specific intrinsic position of the first subcarrier, and a specific numeric value of F are not limited in this embodiment.

Figure 7:
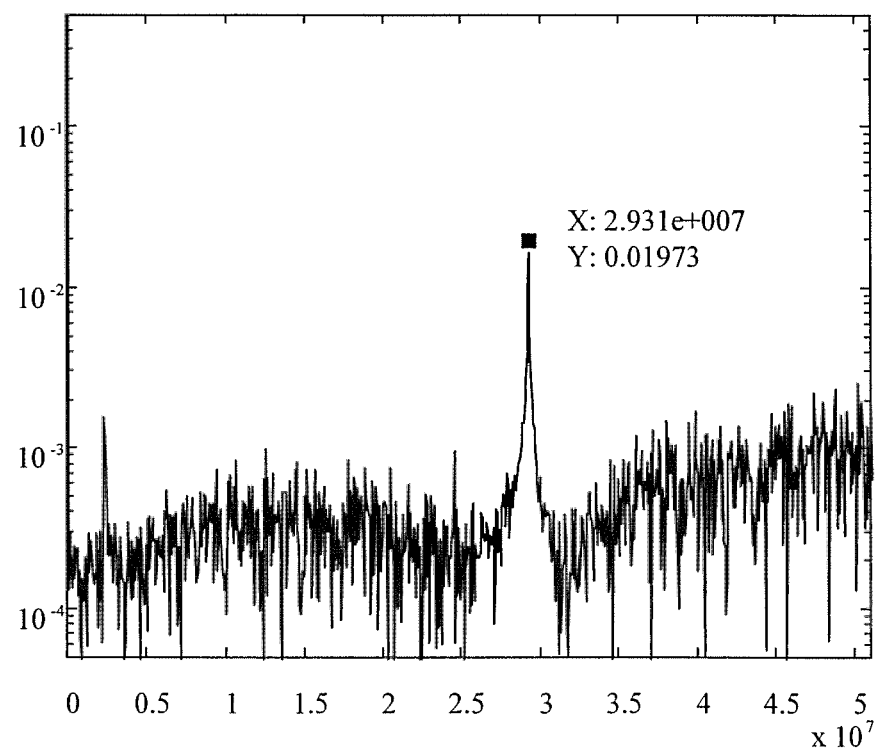
FIG. 7 is a schematic diagram of a second optical spectrum after a pilot signal is loaded according to another embodiment of the present invention.

If a specific implementation method for determining the symbol sequence of the pilot signal according to the information of the pilot signal in step 1 is determining the symbol sequence obtained by performing Hilbert transform on the pilot signal as the symbol sequence of the pilot signal, after the symbol sequence of the pilot signal is loaded on a corresponding subcarrier, a pilot may be generated on a right side of a position of $f_p$ on the optical spectrum, as shown in FIG. 7. A dashed line is the position of $f_p$, and a unit of a horizontal coordinate is $10^7$.

Figure 8:
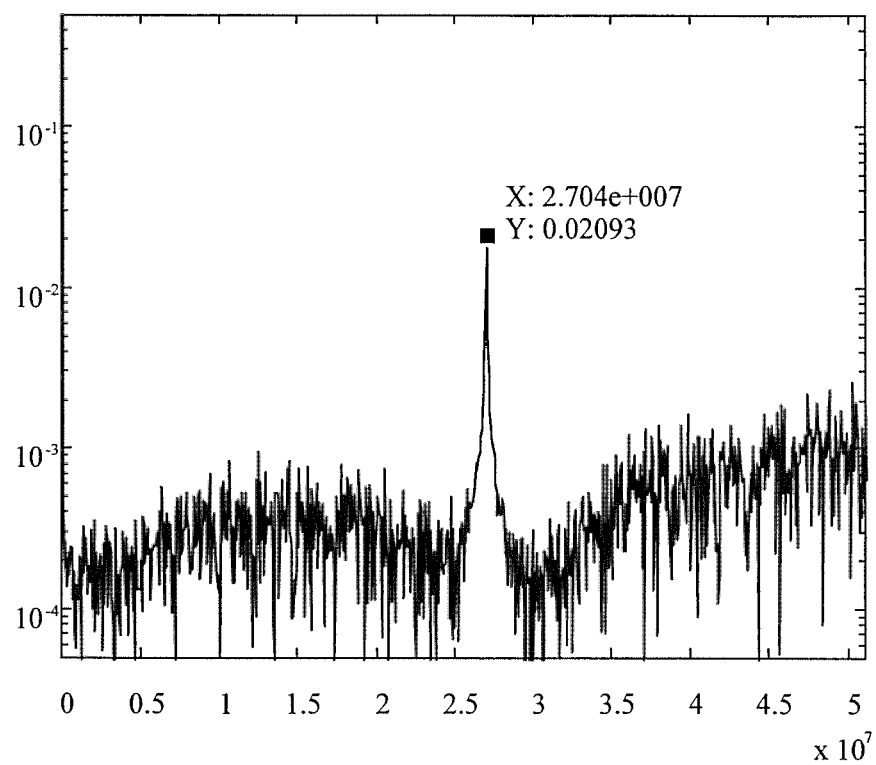
FIG. 8 is a schematic diagram of a third optical spectrum after a pilot signal is loaded according to another embodiment of the present invention.

If a specific implementation method for determining the symbol sequence of the pilot signal according to the information of the pilot signal in step 1 is determining the conjugate sequence of the symbol sequence obtained by performing Hilbert transform on the pilot signal as the symbol sequence of the pilot signal, after the symbol sequence of the pilot signal is loaded on a corresponding subcarrier, a pilot may be generated on a right side of a position of $f_p$ on the optical spectrum, as shown in FIG. 8. A dashed line is the position of $f_p$, and a unit of a horizontal coordinate is $10^7$.

Figure 9:
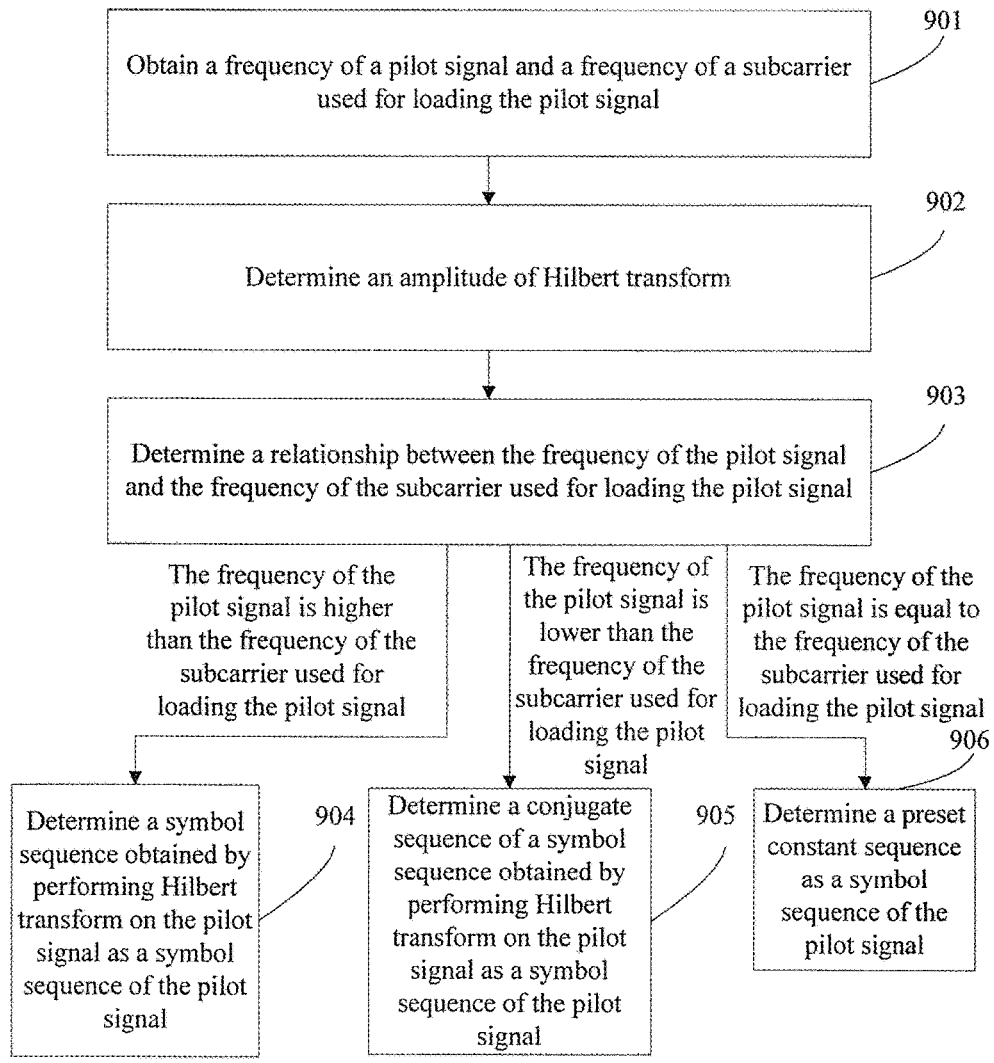
FIG. 9 is a flowchart of a method for determining a symbol sequence of a pilot signal according to another embodiment of the present invention.

In addition, for more clearly describing the foregoing case in which the content corresponding to each subcarrier shown in FIG. 5 is a sub symbol sequence obtained by performing serial-to-parallel conversion on the baseband signal, when a specific method for determining the symbol sequence of the pilot signal is determining the frequency of the pilot signal and the frequency of the subcarrier used for loading the pilot signal, and determining the symbol sequence of the pilot signal according to the relationship between the frequency of the pilot signal and the frequency of the subcarrier used for loading the pilot signal, a specific implementation method is shown in a flowchart in FIG. 9. First, step 901 is performed to obtain a frequency of a pilot signal and a frequency of a subcarrier used for loading the pilot signal. Then step 902 is performed to determine an amplitude of Hilbert transform. Then step 903 is performed to determine a relationship between the frequency of the pilot signal and the frequency of the subcarrier used for loading the pilot signal. If it is determined in step 903 that the frequency of the pilot signal is higher than the frequency of the subcarrier used for loading the pilot signal, step 904 is performed to determine, according to the amplitude of Hilbert transform determined in step 902, that a symbol sequence obtained by performing Hilbert transform on the pilot signal is a symbol sequence of the pilot signal. If it is determined in step 903 that the frequency of the pilot signal is lower than the frequency of the subcarrier used for loading the pilot signal, step 905 is performed to determine, according to the amplitude of Hilbert transform determined in step 902, that a conjugate sequence of a symbol sequence obtained by performing Hilbert transform on the pilot signal is a symbol sequence of the pilot signal. If it is determined in step 903 that the frequency of the pilot signal is equal to the frequency of the subcarrier used for loading the pilot signal, step 906 is performed to determine a preset constant sequence as a symbol sequence of the pilot signal.

It should be noted that, the foregoing assumes that a pilot signal is loaded on a corresponding subcarrier. In a specific embodiment, a plurality of pilot signals may also be loaded on a subcarrier. In a case in which a plurality of pilot signals is loaded on a corresponding subcarrier, a signal obtained after summation of the plurality of pilot signals is used as a total pilot signal loaded on the subcarrier, and the total pilot signal is loaded on the corresponding subcarrier according to the foregoing method.

For example, a pilot signal 1, a pilot signal 2, and a pilot signal 3 all need to be loaded on a corresponding subcarrier 1. In this case, pilot signal 1+pilot signal 2+pilot signal 3 are used as the total pilot signal, and the total pilot signal is loaded on the subcarrier 1 by using the foregoing method.

In addition, in the method provided by this embodiment, a subcarrier for loading a baseband signal may be used to load a pilot signal, and a plurality of pilot signals may be loaded on a subcarrier simultaneously. Assuming that a total quantity of subcarriers of an OFDM optical signal is 1024, when pilot signals are loaded by using the method provided by this embodiment, a quantity of subcarriers used for loading the pilot signals may be reduced.

In addition, in the method provided by this embodiment, the pilot signal may be a periodic signal formed by superimposition of at least two periodic signals, which may reduce complexity of implementation of the pilot signal loading method, and reduce various resources consumed for loading the pilot signal.

According to the method provided by this embodiment, after bit-to-symbol mapping and serial-to-parallel conversion are performed on a baseband signal, content corresponding to a subcarrier that is used for loading a pilot signal and determined from all subcarriers of an OFDM signal is updated according to information of the pilot signal, and further, an OFDM optical signal loaded with the pilot signal is formed. In this way, pilot signals may be loaded on all subcarriers of an OFDM optical signal, a quantity of subcarriers loaded with pilot signals is increased, and further, a quantity of pilot signals loaded on the OFDM optical signal is increased.

Figure 10:
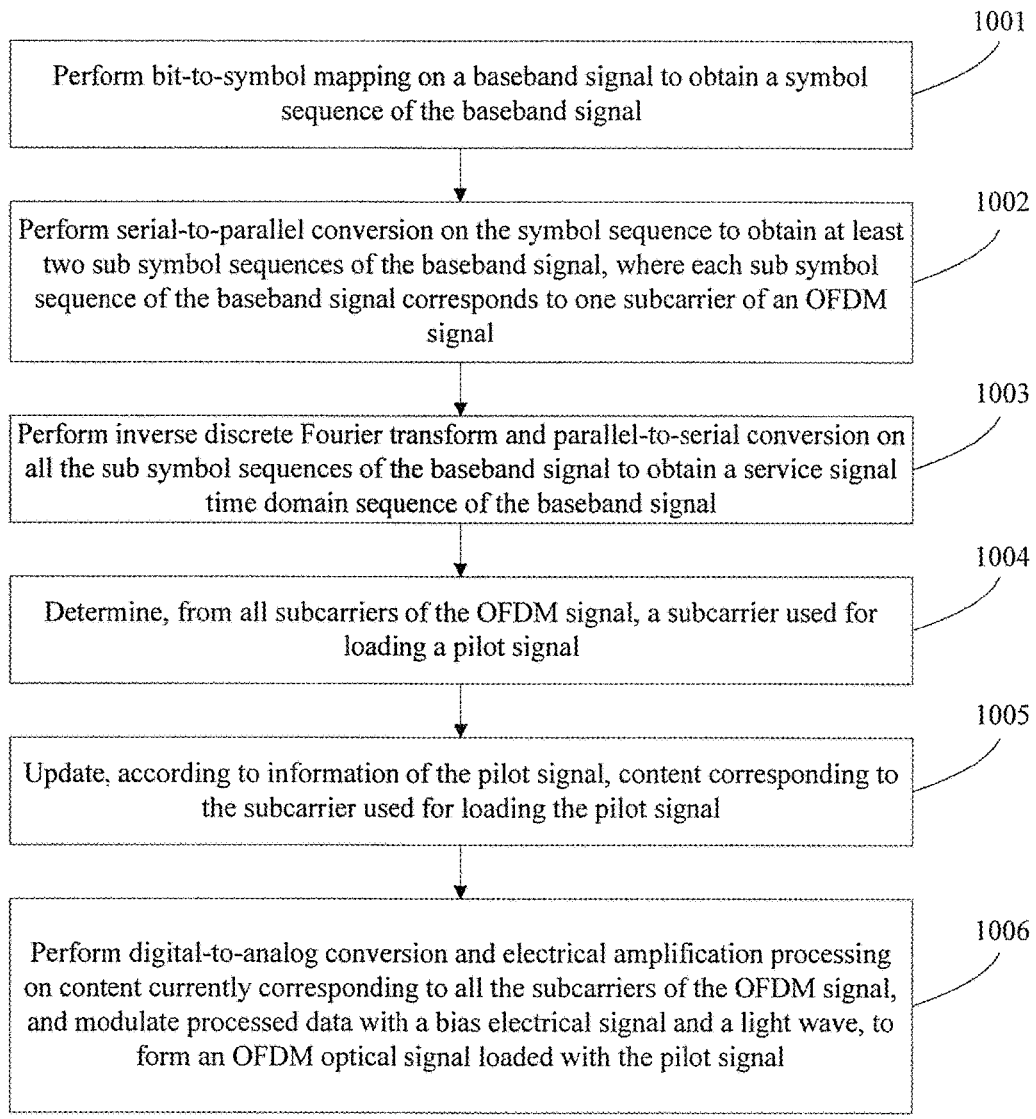
FIG. 10 is a flowchart of a method for modulating an orthogonal frequency division multiplexing optical signal according to another embodiment of the present invention.

With reference to the foregoing implementation environment, another embodiment of the present invention provides a method for modulating an orthogonal frequency division multiplexing optical signal. Referring to FIG. 10, a procedure of the method provided by this embodiment is specifically as follows:

1001. Perform bit-to-symbol mapping on a baseband signal to obtain a symbol sequence of the baseband signal.

1002. Perform serial-to-parallel conversion on the symbol sequence to obtain at least two sub symbol sequences of the baseband signal, where each sub symbol sequence of the baseband signal corresponds to a subcarrier of an orthogonal frequency division multiplexing OFDM signal.

1003. Perform inverse discrete Fourier transform and parallel-to-serial conversion on all the sub symbol sequences of the baseband signal to obtain a service signal time domain sequence of the baseband signal.

1004. Determine, from all subcarriers of the OFDM signal, a subcarrier used for loading a pilot signal.

1005. Update, according to information of the pilot signal, content corresponding to the subcarrier used for loading the pilot signal.

Optionally, the updating, according to information of the pilot signal, content corresponding to the subcarrier used for loading the pilot signal includes:

determining a waveform value sequence of the pilot signal according to the information of the pilot signal; and if the content corresponding to the subcarrier used for loading the pilot signal includes the service signal time domain sequence of the baseband signal, superimposing the waveform value sequence of the pilot signal on the service signal time domain sequence; or obtaining a product of the service signal time domain sequence and the waveform value sequence of the pilot signal, obtaining a loaded sequence, and superimposing the loaded sequence on the service signal time domain sequence.

1006. Perform digital-to-analog conversion and electrical amplification processing on content currently corresponding to all the subcarriers of the OFDM signal, and modulate a light wave by using processed data and a bias electrical signal, to form an OFDM optical signal loaded with the pilot signal.

Optionally, the pilot signal is a periodic signal formed by superimposition of at least two periodic signals, and a high-order harmonic wave component of the periodic signal formed by superimposition of the at least two periodic signals is smaller than a high-order harmonic wave component of any periodic signal in the at least two periodic signals.

Optionally, the at least two periodic signals are a square wave signal and a triangular wave signal.

According to the method provided by this embodiment, after bit-to-symbol mapping, serial-to-parallel conversion, inverse discrete Fourier transform, and parallel-to-serial conversion are performed on a baseband signal, content corresponding to a subcarrier that is used for loading a pilot signal and determined from all subcarriers of an OFDM signal is updated according to information of the pilot signal, and further, an OFDM optical signal loaded with the pilot signal is formed. In this way, pilot signals may be loaded on all subcarriers of an OFDM optical signal, a quantity of subcarriers loaded with pilot signals is increased, and further, a quantity of pilot signals loaded on the OFDM optical signal is increased.

Figure 11:
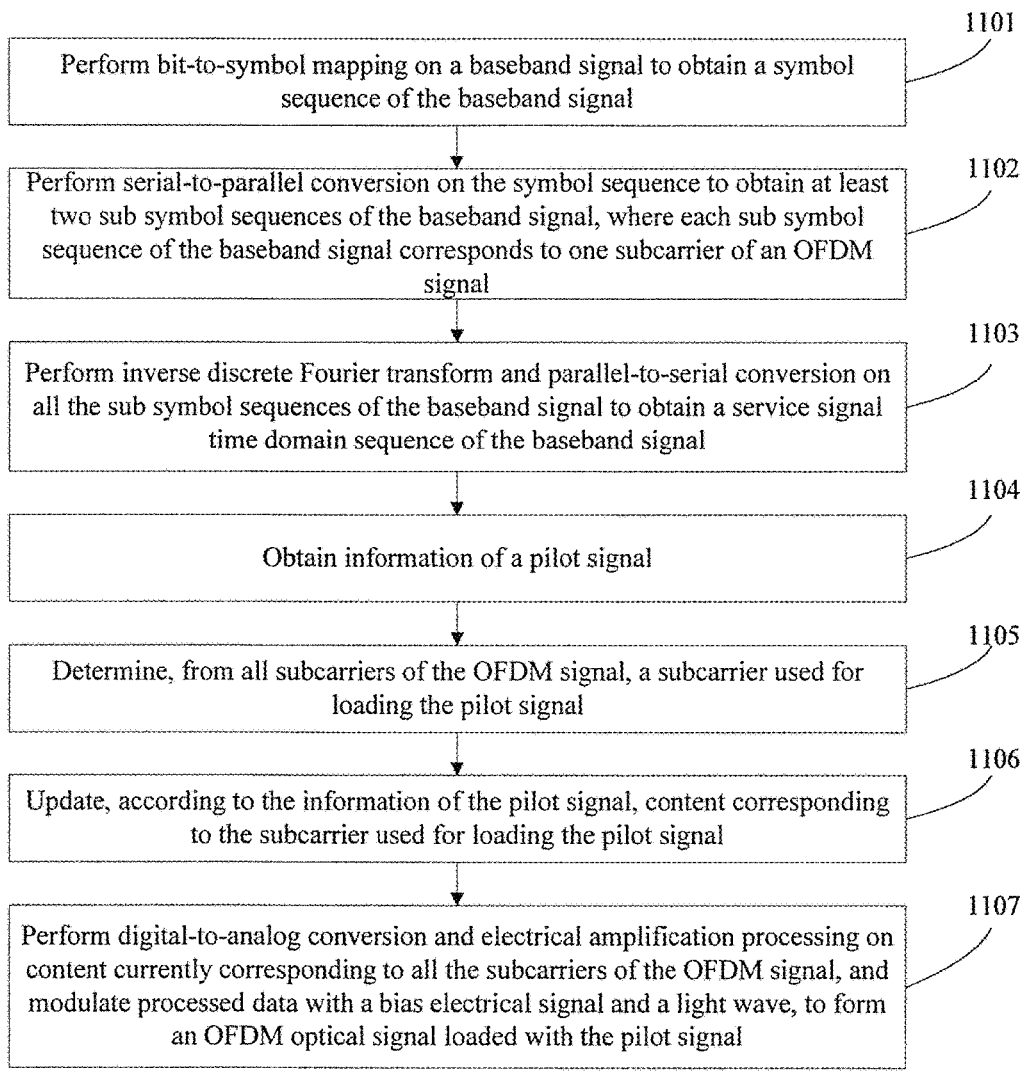
FIG. 11 is a flowchart of a method for modulating an orthogonal frequency division multiplexing optical signal according to another embodiment of the present invention.

Another embodiment of the present invention provides a method for modulating an orthogonal frequency division multiplexing optical signal. With reference to content of the embodiment shown in FIG. 1, referring to FIG. 11, a procedure of the method provided by this embodiment includes:

1101. Perform bit-to-symbol mapping on a baseband signal to obtain a symbol sequence of the baseband signal.

Figure 2:
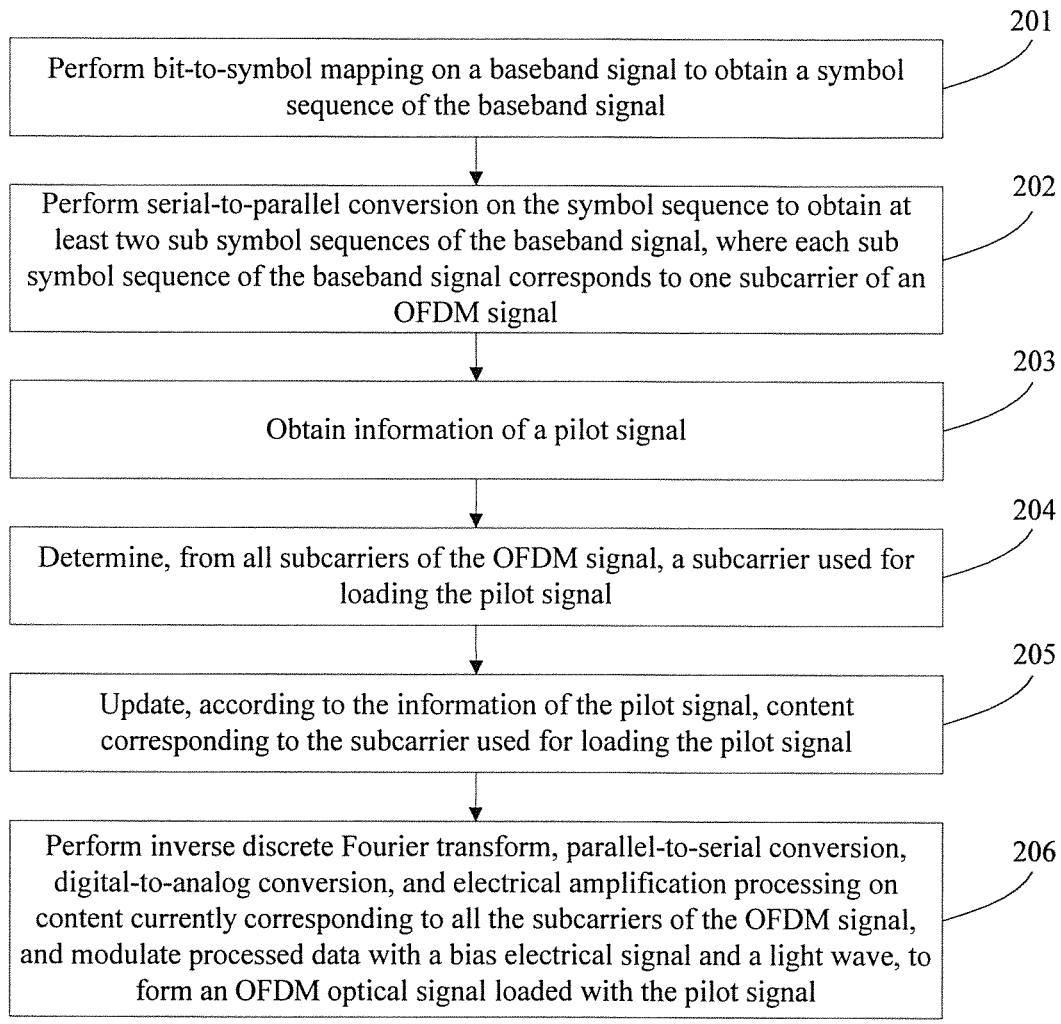
FIG. 2 is a flowchart of a method for modulating an orthogonal frequency division multiplexing optical signal according to another embodiment of the present invention.

A specific implementation principle of the step is the same as a specific implementation principle of the foregoing step 201 in the embodiment shown in FIG. 2. For details, reference may be made to content of the foregoing step 201. Details are not further described herein.

1102. Perform serial-to-parallel conversion on the symbol sequence to obtain at least two sub symbol sequences of the baseband signal, where each sub symbol sequence of the baseband signal corresponds to one subcarrier of an OFDM signal.

A specific implementation principle of the step is the same as a specific implementation principle of the foregoing step 202 in the embodiment shown in FIG. 2. For details, reference may be made to content of the foregoing step 202. Details are not further described herein.

1103. Perform inverse discrete Fourier transform and parallel-to-serial conversion on all the sub symbol sequences of the baseband signal to obtain a service signal time domain sequence of the baseband signal.

A manner of performing inverse discrete Fourier transform and parallel-to-serial conversion on all the sub symbol sequences of the baseband signal to obtain the service signal time domain sequence of the baseband signal is not specifically limited in this embodiment. For details, reference may be made to a conventional manner of performing inverse discrete Fourier transform and parallel-to-serial conversion on data. Details are not further described herein.

Optionally, after inverse discrete Fourier transform is performed on all the sub symbol sequences of the baseband signal, values of all the sub symbol sequences of the baseband signal in a frequency domain are transformed to values in a time domain. In addition, a cyclic prefix may be further inserted in data after inverse discrete Fourier transform processing, and parallel-to-serial conversion is performed on data in which the cyclic prefix is inserted. A manner of inserting the cyclic prefix is not specifically limited in this embodiment.

1104. Obtain information of a pilot signal.

A specific implementation principle of the step is the same as a specific implementation principle of the foregoing step 203 in the embodiment shown in FIG. 2. For details, reference may be made to content of the foregoing step 203. Details are not further described herein.

1105. Determine, from all subcarriers of the OFDM signal, a subcarrier used for loading the pilot signal.

A specific method for determining, from all the subcarriers of the OFDM signal, the subcarrier used for loading the pilot signal, is not limited in this embodiment. To increase a quantity of subcarriers that are loaded with pilot signals, the method provided by this embodiment may determine, from all the subcarriers of the OFDM signal, subcarriers used for loading pilot signals. For example, if a pilot signal loading apparatus pre-knows a subcarrier used for loading a pilot signal, the pre-known subcarrier used for loading the pilot signal is obtained. For another example, it is determined that all the subcarriers of the OFDM signal are subcarriers used for loading pilot signals. For a case in which the determined subcarrier used for loading the pilot signal corresponds to a sub symbol sequence of the baseband signal, the method provided by this embodiment provides a specific loading manner in subsequent steps. For details, reference may be made to the subsequent steps.

1106. Update, according to the information of the pilot signal, content corresponding to the subcarrier used for loading the pilot signal.

A specific method for updating, according to the information of the pilot signal, the content corresponding to the subcarrier used for loading the pilot signal, is not limited in this embodiment. Referring to a schematic diagram of an implementation environment shown in FIG. 12, after inverse discrete Fourier transform and parallel-to-serial conversion are performed on all the sub symbol sequences of the baseband signal to obtain the service signal time domain sequence of the baseband signal, the service signal time domain sequence of the baseband signal corresponds to the subcarriers of the OFDM signal. In addition, before the baseband signal is loaded, a subcarrier used for loading the baseband signal is already determined from the subcarriers of the OFDM signal. Therefore, after the foregoing step 1103, which subcarriers correspond to the service signal time domain sequence of the baseband signal and which subcarriers do not correspond to the service signal time domain sequence of the baseband signal can be determined. That is, content corresponding to some subcarriers of the OFDM signal includes the service signal time domain sequence of the baseband signal, and content corresponding to some subcarriers of the OFDM signal does not include the service signal time domain sequence of the baseband signal. Based on this, after the subcarrier used for loading the pilot signal is determined from the subcarriers of the OFDM signal in step 1105, considering a case in which content corresponding to some subcarriers of the OFDM signal includes the service signal time domain sequence of the baseband signal, the content corresponding to the subcarrier used for loading the pilot signal may be updated according to the information of the pilot signal. A specific updating process includes but is not limited to the following two steps:

Step 1: Determine a waveform value sequence of the pilot signal according to the information of the pilot signal.

A specific method for determining the waveform value sequence of the pilot signal according to the information of the pilot signal is not limited in this embodiment. For example, sampling waveform values of the pilot signal are determined according to the information of the pilot signal, and it is determined that a sequence formed by the sampling waveform values of the pilot signal is the waveform value sequence of the pilot signal.

Step 2: If the content corresponding to the subcarrier used for loading the pilot signal includes the service signal time domain sequence of the baseband signal, update, by using the following two manners, the content corresponding to the subcarrier used for loading the pilot signal.

Manner 1: Superimpose the waveform value sequence of the pilot signal on the service signal time domain sequence.

Assuming that the waveform value sequence of the pilot signal is $P(k)$ and that the content corresponding to the subcarrier for loading the pilot signal includes the service signal time domain sequence $w(k)$ of the baseband signal, the pilot signal is loaded, by using $w(k)+p(k)$, on the subcarrier used for loading the pilot signal.

Manner 2: Obtain a product of the service signal time domain sequence and the waveform value sequence of the pilot signal, obtain a loaded sequence, and superimpose the loaded sequence on the service signal time domain sequence.

Still assuming that the waveform value sequence of the pilot signal is $P(k)$ and that the content corresponding to the subcarrier for loading the pilot signal includes the service signal time domain sequence $w(k)$ of the baseband signal, $w(k) \times p(k)$ is used as the loaded sequence; and the pilot signal is loaded, by using $w(k)+(w(k) \times p(k))$, on the subcarrier used for loading the pilot signal.

It should be noted that, in the foregoing description, the manner of loading the pilot signal only in a case in which the content corresponding to the subcarrier used for loading the pilot signal includes the service signal time domain sequence of the baseband signal is described. In a case in which the content corresponding to the subcarrier used for loading the pilot signal does not include the service signal time domain sequence of the baseband signal, the pilot signal may be loaded according to a conventional pilot signal loading manner, which is not specifically limited in this embodiment.

Figure 12:
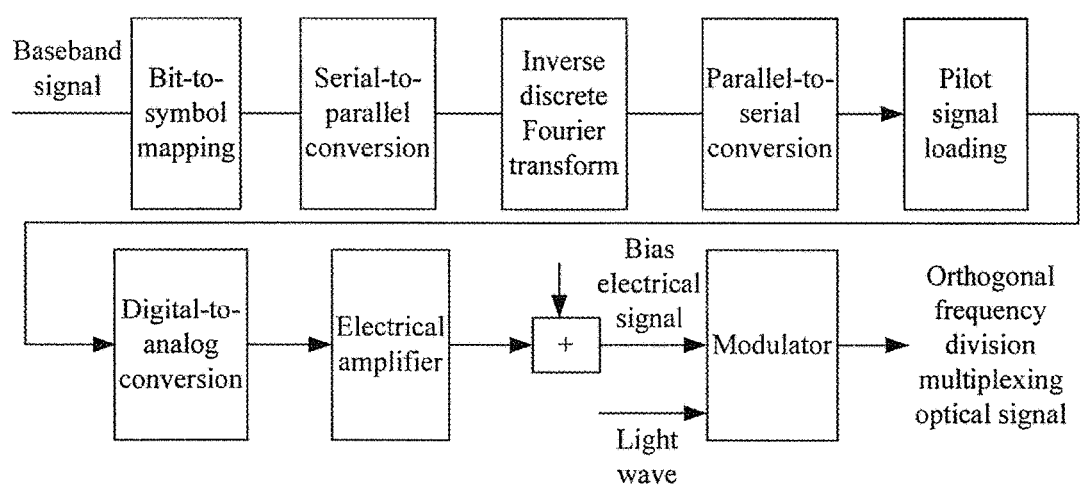
FIG. 12 is a schematic diagram of an implementation environment of a method for modulating an orthogonal frequency division multiplexing optical signal according to another embodiment of the present invention.

In addition, in the foregoing description, it is assumed that content corresponding to each subcarrier is a service signal time domain sequence that is obtained after serial-to-parallel conversion is performed on the baseband signal to obtain sub symbol sequences and parallel-to-serial conversion is performed on the sub symbol sequences as shown in FIG. 12. In addition, the content corresponding to each subcarrier may also be a service signal time domain sequence that is obtained after serial-to-parallel conversion is performed on the baseband signal to obtain sub symbol sequences and then parallel-to-serial conversion and clipping are performed on the sub symbol sequences. That is, the content corresponding to each subcarrier may be any service signal time domain sequence after serial-to-parallel conversion is performed on the baseband signal to obtain sub symbol sequences and parallel-to-serial conversion is performed on the sub symbol sequences and before digital-to-analog conversion is performed.

1107. Perform digital-to-analog conversion and electrical amplification processing on content currently corresponding to all the subcarriers of the OFDM signal, and modulate a light wave by using processed data and a bias electrical signal, to form an OFDM optical signal loaded with the pilot signal.

For this step, if the content corresponding to the subcarrier used for loading the pilot signal includes the service signal time domain sequence of the baseband signal, for the manner 1 of the foregoing step 1106, because the content corresponding to the subcarrier used for loading the pilot signal is updated in the manner of superimposing the waveform value sequence of the pilot signal on the service signal time domain sequence, the content currently corresponding to the subcarrier used for loading the pilot signal includes a sequence obtained after the waveform value sequence of the pilot signal is superimposed on the service signal time domain sequence. Alternatively, the content currently corresponding to the subcarrier used for loading the pilot signal includes the waveform value sequence of the pilot signal, but does not include a sub symbol sequence of the baseband signal. Content currently corresponding to other subcarriers not used for loading the pilot signal may include a sub symbol sequence of the baseband signal, or may not include a sub symbol sequence of the baseband signal. For the manner 2 of the foregoing step 1106, because the content corresponding to the subcarrier used for loading the pilot signal is updated in the manner of obtaining the product of the service signal time domain sequence and the waveform value sequence of the pilot signal, obtaining the loaded sequence, and superimposing the loaded sequence on the service signal time domain sequence, the content currently corresponding to the subcarrier used for loading the pilot signal includes a sequence obtained after the loaded sequence is superimposed on the service signal time domain sequence. Alternatively, the content currently corresponding to the subcarrier used for loading the pilot signal includes the waveform value sequence of the pilot signal, but does not include a sub symbol sequence of the baseband signal. Content currently corresponding to other subcarriers not used for loading the pilot signal may include a sub symbol sequence of the baseband signal, or may not include a sub symbol sequence of the baseband signal.

No matter what is included in the content currently corresponding to each subcarrier of the OFDM signal, after the content corresponding to the subcarrier used for loading the pilot signal is updated according to the information of the pilot signal, as shown in FIG. 12, in the method provided by this embodiment, digital-to-analog conversion and electrical amplification processing are performed on the content currently corresponding to all the subcarriers of the OFDM signal, and the processed data is modulated with the bias electrical signal and the light wave, to form the OFDM optical signal loaded with the pilot signal. Manners of performing digital-to-analog conversion and electrical amplification processing on the content currently corresponding to all the subcarriers of the OFDM signal and modulating the processed data with the bias electrical signal and the light wave are not specifically limited in this embodiment. In specific implementation, a conventional processing manner may be used.

Optionally, before digital-to-analog conversion is performed on the content currently corresponding to all the subcarriers of the OFDM signal, clipping processing may be further performed on data after parallel-to-serial conversion; afterward, digital-to-analog conversion and electrical amplification processing are performed on data after clipping processing; and finally, the processed data is modulated with the bias electrical signal and the light wave, to form the OFDM optical signal loaded with the pilot signal. A manner of clipping is not specifically limited in this embodiment.

It should be noted that, the foregoing assumes that a pilot signal is loaded on a corresponding subcarrier. In a specific embodiment, a plurality of pilot signals may also be loaded on a subcarrier. In a case in which a plurality of pilot signals is loaded on a corresponding subcarrier, a signal obtained after summation of the plurality of pilot signals is used as a total pilot signal loaded on the subcarrier, and the total pilot signal is loaded on the corresponding subcarrier according to the foregoing method.

For example, a pilot signal 1, a pilot signal 2, and a pilot signal 3 all need to be loaded on a corresponding subcarrier 1. In this case, pilot signal 1+pilot signal 2+pilot signal 3 are used as the total pilot signal, and the total pilot signal is loaded on the subcarrier 1 by using the foregoing method.

In addition, in the method provided by this embodiment, a subcarrier for loading a baseband signal may be used to load a pilot signal, and a plurality of pilot signals may be loaded on a subcarrier simultaneously. Assuming that a total quantity of subcarriers of an OFDM optical signal is 1024, when pilot signals are loaded by using the method provided by this embodiment, a quantity of subcarriers used for loading the pilot signals may be reduced.

In addition, in the method provided by this embodiment, the pilot signal may be a periodic signal formed by superimposition of at least two periodic signals, which may reduce complexity of implementation of the pilot signal loading method, and reduce various resources consumed for loading the pilot signal.

According to the method provided by this embodiment, after bit-to-symbol mapping, serial-to-parallel conversion, inverse discrete Fourier transform, and parallel-to-serial conversion are performed on a baseband signal, content corresponding to a subcarrier that is used for loading a pilot signal and determined from all subcarriers of an OFDM signal is updated according to information of the pilot signal, and further, an OFDM optical signal loaded with the pilot signal is formed. In this way, pilot signals may be loaded on all subcarriers of an OFDM optical signal, a quantity of subcarriers loaded with pilot signals is increased, and further, a quantity of pilot signals loaded on the OFDM optical signal is increased.

Figure 13:
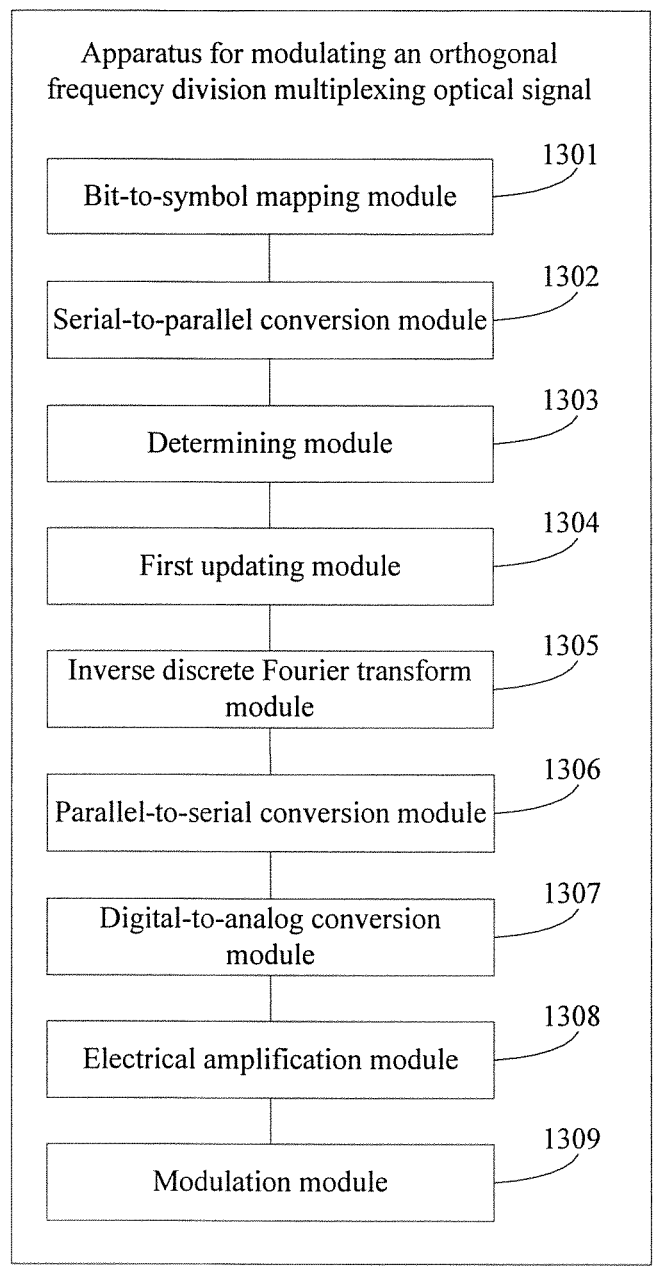
FIG. 13 is a schematic structural diagram of an apparatus for modulating an orthogonal frequency division multiplexing optical signal according to another embodiment of the present invention.

Another embodiment of the present invention provides an apparatus for modulating an orthogonal frequency division multiplexing optical signal. The apparatus is used to perform the method for modulating an orthogonal frequency division multiplexing optical signal according to any one of the embodiments shown in FIG. 1 to FIG. 9. Referring to FIG. 13, the apparatus includes:

a bit-to-symbol mapping module 1301, configured to perform bit-to-symbol mapping on a baseband signal to obtain a symbol sequence of the baseband signal;

a serial-to-parallel conversion module 1302, configured to perform serial-to-parallel conversion on the symbol sequence obtained by the bit-to-symbol mapping module 1301 to obtain at least two sub symbol sequences of the baseband signal, where each sub symbol sequence of the baseband signal corresponds to one subcarrier of an OFDM signal;

a determining module 1303, configured to determine, from all subcarriers of the OFDM signal, a subcarrier used for loading a pilot signal;

a first updating module 1304, configured to update, according to information of the pilot signal, content corresponding to the subcarrier that is used for loading the pilot signal and determined by the determining module 1303;

an inverse discrete Fourier transform module 1305, configured to perform inverse discrete Fourier transform on content currently corresponding to all the subcarriers of the OFDM signal;

a parallel-to-serial conversion module 1306, configured to perform parallel-to-serial conversion on data processed by the inverse discrete Fourier transform module 1305;

a digital-to-analog conversion module 1307, configured to perform digital-to-analog conversion on data processed by the parallel-to-serial conversion module 1306;

an electrical amplification module 1308, configured to perform electrical amplification processing on data processed by the digital-to-analog conversion module 1307; and a modulation module 1309, configured to modulate data processed by the electrical amplification module 1308 with a bias electrical signal and a light wave, to form an OFDM optical signal loaded with the pilot signal.

Figure 14:
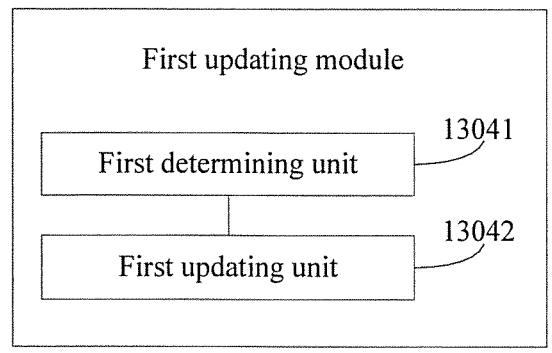
FIG. 14 is a schematic structural diagram of a first updating module according to another embodiment of the present invention.

Referring to FIG. 14, the first updating module 1304 includes:

a first determining unit 13041, configured to determine a symbol sequence of the pilot signal according to the information of the pilot signal, where the symbol sequence of the pilot signal is a discrete periodic sequence; and a first updating unit 13042, configured to: when the content corresponding to the subcarrier used for loading the pilot signal includes a sub symbol sequence of the baseband signal, replace the sub symbol sequence of the baseband signal with the symbol sequence of the pilot signal that is determined by the first determining unit 13041, or superimpose, on the sub symbol sequence of the baseband signal, the symbol sequence of the pilot signal that is determined by the first determining unit 13041.

Figure 15:
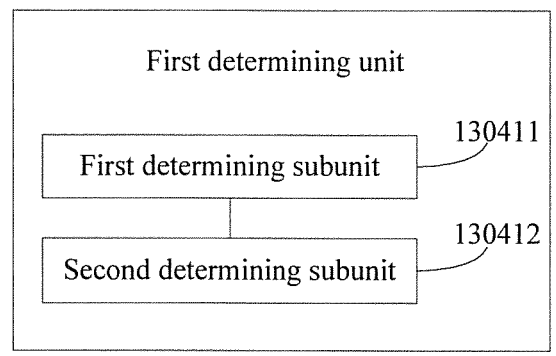
FIG. 15 is a schematic structural diagram of a first determining unit according to another embodiment of the present invention.

Referring to FIG. 15, the first determining unit 13041 includes:

a first determining subunit 130411, configured to determine a frequency of the pilot signal according to the information of the pilot signal, and determine a frequency of the subcarrier used for loading the pilot signal; and a second determining subunit 130412, configured to determine the symbol sequence of the pilot signal according to a relationship between the frequency of the pilot signal and the frequency of the subcarrier used for loading the pilot signal that are determined by the first determining subunit 130411.

The second determining subunit 130412 is configured to determine a symbol sequence obtained by performing Hilbert transform on the pilot signal as the symbol sequence of the pilot signal when the frequency of the pilot signal is higher than the frequency of the subcarrier used for loading the pilot signal; or the second determining subunit 130412 is configured to determine a conjugate sequence of a symbol sequence obtained by performing Hilbert transform on the pilot signal as the symbol sequence of the pilot signal when the frequency of the pilot signal is lower than the frequency of the subcarrier used for loading the pilot signal; or the second determining subunit 130412 is configured to determine a preset constant sequence as the symbol sequence of the pilot signal when the frequency of the pilot signal is equal to the frequency of the subcarrier used for loading the pilot signal.

The pilot signal is a periodic signal formed by superimposition of at least two periodic signals, and a high-order harmonic wave component of the periodic signal formed by superimposition of the at least two periodic signals is smaller than a high-order harmonic wave component of any periodic signal in the at least two periodic signals.

The at least two periodic signals are a square wave signal and a triangular wave signal respectively.

According to the apparatus provided by this embodiment, after bit-to-symbol mapping and serial-to-parallel conversion are performed on a baseband signal, content corresponding to a subcarrier that is used for loading a pilot signal and determined from all subcarriers of an OFDM signal is updated according to information of the pilot signal, and further, an OFDM optical signal loaded with the pilot signal is formed. In this way, pilot signals may be loaded on all subcarriers of an OFDM optical signal, a quantity of subcarriers loaded with pilot signals is increased, and further, a quantity of pilot signals loaded on the OFDM optical signal is increased.

Figure 16:
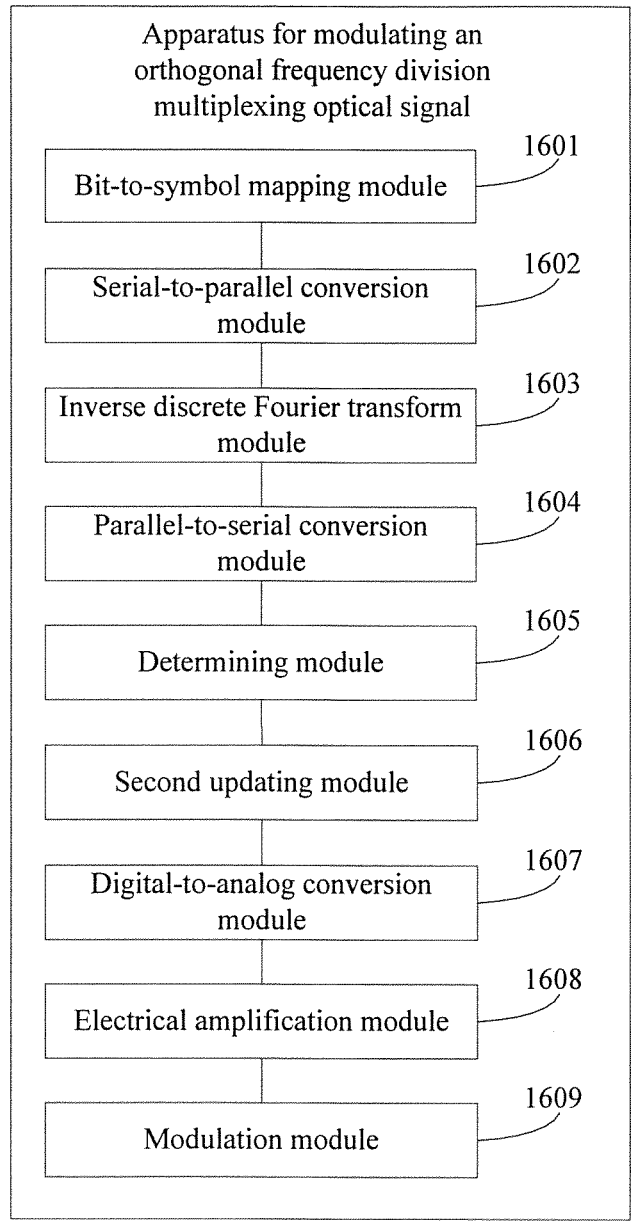
FIG. 16 is a schematic structural diagram of an apparatus for modulating an orthogonal frequency division multiplexing optical signal according to another embodiment of the present invention.

Another embodiment of the present invention provides an apparatus for modulating an orthogonal frequency division multiplexing optical signal. The apparatus is used to perform the method for modulating an orthogonal frequency division multiplexing optical signal according to any one of the embodiments shown in FIG. 10 to FIG. 12. Referring to FIG. 16, the apparatus includes:

a bit-to-symbol mapping module 1601, configured to perform bit-to-symbol mapping on a baseband signal to obtain a symbol sequence of the baseband signal;

a serial-to-parallel conversion module 1602, configured to perform serial-to-parallel conversion on the symbol sequence obtained by the bit-to-symbol mapping module 1601 to obtain at least two sub symbol sequences of the baseband signal, where each sub symbol sequence of the baseband signal corresponds to one subcarrier of an OFDM signal;

an inverse discrete Fourier transform module 1603, configured to perform inverse discrete Fourier transform on all the sub symbol sequences of the baseband signal;

a parallel-to-serial conversion module 1604, configured to perform parallel-to-serial conversion on data processed by the inverse discrete Fourier transform module 1603 to obtain a service signal time domain sequence of the baseband signal;

a determining module 1605, configured to determine, from all subcarriers of the OFDM signal, a subcarrier used for loading a pilot signal;

a second updating module 1606, configured to update, according to information of the pilot signal, content corresponding to the subcarrier that is used for loading the pilot signal and determined by the determining module 1605;

a digital-to-analog conversion module 1607, configured to perform digital-to-analog conversion on content currently corresponding to all the subcarriers of the OFDM signal;

an electrical amplification module 1608, configured to perform electrical amplification processing on data processed by the digital-to-analog conversion module 1607; and a modulation module 1609, configured to modulate data processed by the electrical amplification module 1608 with a bias electrical signal and a light wave, to form an OFDM optical signal loaded with the pilot signal.

Figure 17:
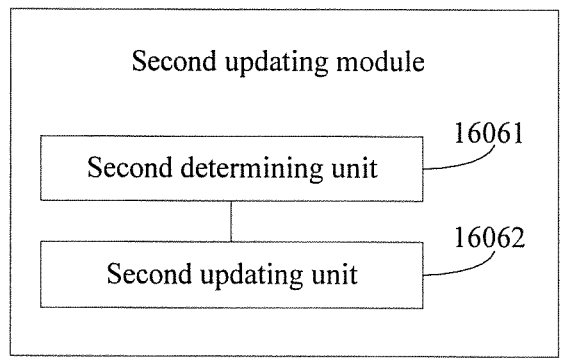
FIG. 17 is a schematic structural diagram of a second updating module according to another embodiment of the present invention.

Referring to FIG. 17, the second updating module 1606 includes:

a second determining unit 16061, configured to determine a waveform value sequence of the pilot signal according to the information of the pilot signal; and a second updating unit 16062, configured to: when the content corresponding to the subcarrier used for loading the pilot signal includes the service signal time domain sequence of the baseband signal, superimpose, on the service signal time domain sequence, the waveform value sequence of the pilot signal that is determined by the second determining unit 16061; or obtain a product of the service signal time domain sequence and the waveform value sequence of the pilot signal that is determined by the second determining unit 16061, obtain a loaded sequence, and superimpose the loaded sequence on the service signal time domain sequence.

The pilot signal is a periodic signal formed by superimposition of at least two periodic signals, and a high-order harmonic wave component of the periodic signal formed by superimposition of the at least two periodic signals is smaller than a high-order harmonic wave component of any periodic signal in the at least two periodic signals.

The at least two periodic signals are a square wave signal and a triangular wave signal.

According to the apparatus provided by this embodiment, after bit-to-symbol mapping, serial-to-parallel conversion, inverse discrete Fourier transform, and parallel-to-serial conversion are performed on a baseband signal, content corresponding to a subcarrier that is used for loading a pilot signal and determined from all subcarriers of an OFDM signal is updated according to information of the pilot signal, and further, an OFDM optical signal loaded with the pilot signal is formed. In this way, pilot signals may be loaded on all subcarriers of an OFDM optical signal, a quantity of subcarriers loaded with pilot signals is increased, and further, a quantity of pilot signals loaded on the OFDM optical signal is increased.

Figure 18:
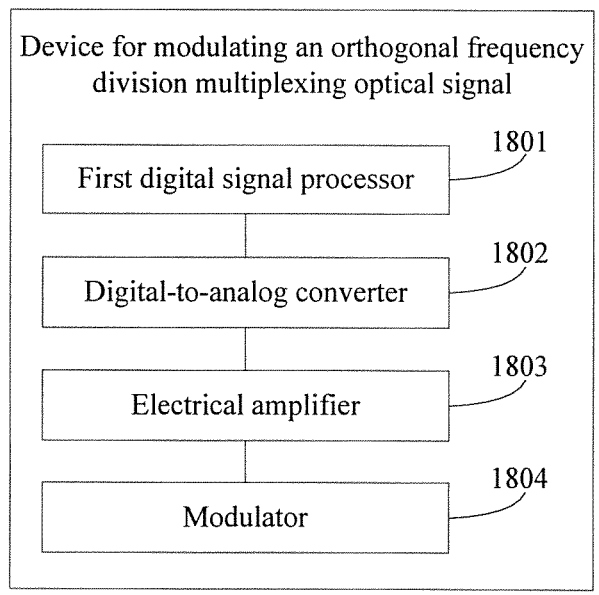
FIG. 18 is a schematic structural diagram of a device for modulating an orthogonal frequency division multiplexing optical signal according to another embodiment of the present invention.

Another embodiment of the present invention provides a device for modulating an orthogonal frequency division multiplexing optical signal. The device is used to perform the method for modulating an orthogonal frequency division multiplexing optical signal according to any one of the embodiments shown in FIG. 1 to FIG. 9. Referring to FIG. 18, the device includes a first digital signal processor 1801, a digital-to-analog converter 1802, an electrical amplifier 1803, and a modulator 1804, where the first digital signal processor 1801 is configured to: perform bit-to-symbol mapping on a baseband signal to obtain a symbol sequence of the baseband signal; perform serial-to-parallel conversion on the symbol sequence to obtain at least two sub symbol sequences of the baseband signal, where each sub symbol sequence of the baseband signal corresponds to one subcarrier of an OFDM signal; determine, from all subcarriers of the OFDM signal, a subcarrier used for loading a pilot signal; update, according to information of the pilot signal, content corresponding to the subcarrier used for loading the pilot signal; and perform inverse discrete Fourier transform and parallel-to-serial conversion on content currently corresponding to all the subcarriers of the OFDM signal;

the digital-to-analog converter 1802 is configured to perform digital-to-analog conversion on data processed by the first digital signal processor 1801;

the electrical amplifier 1803 is configured to perform electrical amplification processing on data processed by the digital-to-analog converter 1802; and the modulator 1804 is configured to modulate data processed by the electrical amplifier 1803 with a bias electrical signal and a light wave, to form an OFDM optical signal loaded with the pilot signal.

Optionally, the first digital signal processor 1801 is configured to: determine a symbol sequence of the pilot signal according to the information of the pilot signal, where the symbol sequence of the pilot signal is a discrete periodic sequence; and when the content corresponding to the subcarrier used for loading the pilot signal includes a sub symbol sequence of the baseband signal, replace the sub symbol sequence of the baseband signal with the symbol sequence of the pilot signal, or superimpose the symbol sequence of the pilot signal on the sub symbol sequence of the baseband signal.

Optionally, the first digital signal processor 1801 is configured to: determine a frequency of the pilot signal according to the information of the pilot signal, and determine a frequency of the subcarrier used for loading the pilot signal; and determine the symbol sequence of the pilot signal according to a relationship between the frequency of the pilot signal and the frequency of the subcarrier used for loading the pilot signal.

Optionally, the first digital signal processor 1801 is configured to determine a symbol sequence obtained by performing Hilbert transform on the pilot signal as the symbol sequence of the pilot signal when the frequency of the pilot signal is higher than the frequency of the subcarrier used for loading the pilot signal; or the first digital signal processor 1801 is configured to determine a conjugate sequence of a symbol sequence obtained by performing Hilbert transform on the pilot signal as the symbol sequence of the pilot signal when the frequency of the pilot signal is lower than the frequency of the subcarrier used for loading the pilot signal; or the first digital signal processor 1801 is configured to determine a preset constant sequence as the symbol sequence of the pilot signal when the frequency of the pilot signal is equal to the frequency of the subcarrier used for loading the pilot signal.

Optionally, the pilot signal is a periodic signal formed by superimposition of at least two periodic signals, and a high-order harmonic wave component of the periodic signal formed by superimposition of the at least two periodic signals is smaller than a high-order harmonic wave component of any periodic signal in the at least two periodic signals.

Optionally, the at least two periodic signals are a square wave signal and a triangular wave signal respectively.

According to the device provided by this embodiment, after bit-to-symbol mapping and serial-to-parallel conversion are performed on a baseband signal, content corresponding to a subcarrier that is used for loading a pilot signal and determined from all subcarriers of an OFDM signal is updated according to information of the pilot signal, and further, an OFDM optical signal loaded with the pilot signal is formed. In this way, pilot signals may be loaded on all subcarriers of an OFDM optical signal, a quantity of subcarriers loaded with pilot signals is increased, and further, a quantity of pilot signals loaded on the OFDM optical signal is increased.

Figure 19:
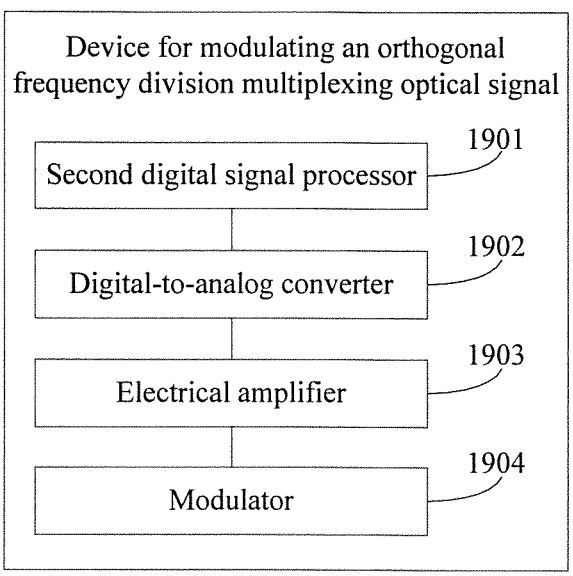
FIG. 19 is a schematic structural diagram of a device for modulating an orthogonal frequency division multiplexing optical signal according to another embodiment of the present invention.

Another embodiment of the present invention provides a device for modulating an orthogonal frequency division multiplexing optical signal. The device is used to perform the method for modulating an orthogonal frequency division multiplexing optical signal according to any one of the embodiments shown in FIG. 10 to FIG. 12. Referring to FIG. 19, the device includes a second digital signal processor 1901, a digital-to-analog converter 1902, an electrical amplifier 1903, and a modulator 1904, where the second digital signal processor 1901 is configured to: perform bit-to-symbol mapping on a baseband signal to obtain a symbol sequence of the baseband signal; perform serial-to-parallel conversion on the symbol sequence to obtain at least two sub symbol sequences of the baseband signal, where each sub symbol sequence of the baseband signal corresponds to one subcarrier of an OFDM signal; perform inverse discrete Fourier transform and parallel-to-serial conversion on all the sub symbol sequences of the baseband signal to obtain a service signal time domain sequence of the baseband signal; determine, from all subcarriers of the OFDM signal, a subcarrier used for loading a pilot signal; and update, according to information of the pilot signal, content corresponding to the subcarrier used for loading the pilot signal;

the digital-to-analog converter 1902 is configured to perform digital-to-analog conversion on data processed by the second digital signal processor 1901;

the electrical amplifier 1903 is configured to perform electrical amplification processing on data processed by the digital-to-analog converter 1902; and the modulator 1904 is configured to modulate data processed by the electrical amplifier 1903 with a bias electrical signal and a light wave, to form an OFDM optical signal loaded with the pilot signal.

Optionally, the second digital signal processor 1901 is configured to: determine a waveform value sequence of the pilot signal according to the information of the pilot signal; and when the content corresponding to the subcarrier used for loading the pilot signal includes the service signal time domain sequence of the baseband signal, superimpose the waveform value sequence of the pilot signal on the service signal time domain sequence; or obtain a product of the service signal time domain sequence and the waveform value sequence of the pilot signal, obtain a loaded sequence, and superimpose the loaded sequence on the service signal time domain sequence.

Optionally, the pilot signal is a periodic signal formed by superimposition of at least two periodic signals, and a high-order harmonic wave component of the periodic signal formed by superimposition of the at least two periodic signals is smaller than a high-order harmonic wave component of any periodic signal in the at least two periodic signals.

Optionally, the at least two periodic signals are a square wave signal and a triangular wave signal.

According to the device provided by this embodiment, after bit-to-symbol mapping, serial-to-parallel conversion, inverse discrete Fourier transform, and parallel-to-serial conversion are performed on a baseband signal, content corresponding to a subcarrier that is used for loading a pilot signal and determined from all subcarriers of an OFDM signal is updated according to information of the pilot signal, and further, an OFDM optical signal loaded with the pilot signal is formed. In this way, pilot signals may be loaded on all subcarriers of an OFDM optical signal, a quantity of subcarriers loaded with pilot signals is increased, and further, a quantity of pilot signals loaded on the OFDM optical signal is increased.

It should be noted that, in a process of loading a pilot signal by the apparatus for modulating an orthogonal frequency division multiplexing optical signal according to the foregoing embodiment, only division of the foregoing functional modules is used as an example for description. In an actual application, the foregoing functions may be allocated to different functional modules for implementation according to requirements, that is, an internal structure of the apparatus is divided into different functional modules for implementing all or some functions described above. In addition, the apparatus and device for modulating an orthogonal frequency division multiplexing optical signal according to the foregoing embodiments belong to a same conception as the embodiment of the method for modulating an orthogonal frequency division multiplexing optical signal. For specific implementation processes of the apparatus and device, reference may be made to the method embodiment. Details are not further described herein.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A method for modulating an orthogonal frequency division multiplexing optical signal, the method comprising:
   performing bit-to-symbol mapping on a baseband signal to obtain a symbol sequence of the baseband signal;
   performing serial-to-parallel conversion on the symbol sequence to obtain at least two sub symbol sequences of the baseband signal, wherein each sub symbol sequence of the baseband signal corresponds to a subcarrier of an orthogonal frequency division multiplexing (OFDM) signal;
   determining, from all subcarriers of the OFDM signal, a subcarrier used for loading a pilot signal, wherein content corresponding to the subcarrier used for loading the pilot signal comprises a sub symbol sequence of the baseband signal;
   determining a symbol sequence of the pilot signal according to information of the pilot signal, wherein the symbol sequence of the pilot signal is a discrete periodic sequence;
   updating, according to the information of the pilot signal, content corresponding to the subcarrier used for loading the pilot signal by replacing the sub symbol sequence of the baseband signal with the symbol sequence of the pilot signal; and
   performing inverse discrete Fourier transform, parallel-to-serial conversion, digital-to-analog conversion, and electrical amplification processing on content currently corresponding to all the subcarriers of the OFDM signal, and modulating a light wave by using processed data and a bias electrical signal, to form an OFDM optical signal loaded with the pilot signal.

2. The method according to claim 1, wherein determining a symbol sequence of the pilot signal according to the information of the pilot signal comprises:
   determining a frequency of the pilot signal according to the information of the pilot signal, and determining a frequency of the subcarrier used for loading the pilot signal; and
   determining the symbol sequence of the pilot signal according to a relationship between the frequency of the pilot signal and the frequency of the subcarrier used for loading the pilot signal.

3. A method for modulating an orthogonal frequency division multiplexing optical signal, the method comprising:
   performing bit-to-symbol mapping on a baseband signal to obtain a symbol sequence of the baseband signal;
   performing serial-to-parallel conversion on the symbol sequence to obtain at least two sub symbol sequences of the baseband signal, wherein each sub symbol sequence of the baseband signal corresponds to a subcarrier of an orthogonal frequency division multiplexing (OFDM) signal;
   determining, from all subcarriers of the OFDM signal, a subcarrier used for loading a pilot signal;
   determining a frequency of the pilot signal according to information of the pilot signal and a frequency of the subcarrier used for loading the pilot signal;
   determining a symbol sequence of the pilot signal according to a relationship between the frequency of the pilot signal and the frequency of the subcarrier used for loading the pilot signal by:
     when the frequency of the pilot signal is higher than the frequency of the subcarrier used for loading the pilot signal, determining a symbol sequence obtained by performing Hilbert transform on the pilot signal as the symbol sequence of the pilot signal; or
     when the frequency of the pilot signal is lower than the frequency of the subcarrier used for loading the pilot signal, determining a conjugate sequence of a symbol sequence obtained by performing Hilbert transform on the pilot signal as the symbol sequence of the pilot signal; or
     when the frequency of the pilot signal is equal to the frequency of the subcarrier used for loading the pilot signal, determining a preset constant sequence as the symbol sequence of the pilot signal;
   updating, according to the symbol sequence of the pilot signal of the pilot signal, content corresponding to the subcarrier used for loading the pilot signal; and
   performing inverse discrete Fourier transform, parallel-to-serial conversion, digital-to-analog conversion, and electrical amplification processing on content currently corresponding to all the subcarriers of the OFDM signal, and modulating a light wave by using processed data and a bias electrical signal, to form an OFDM optical signal loaded with the pilot signal.

4. A method for modulating an orthogonal frequency division multiplexing optical signal, the method comprising:
   performing bit-to-symbol mapping on a baseband signal to obtain a symbol sequence of the baseband signal;
   performing serial-to-parallel conversion on the symbol sequence to obtain at least two sub symbol sequences of the baseband signal, wherein each sub symbol sequence of the baseband signal corresponds to a subcarrier of an orthogonal frequency division multiplexing (OFDM) signal;
   determining, from all subcarriers of the OFDM signal, a subcarrier used for loading a pilot signal, wherein the pilot signal is a periodic signal formed by superimposition of at least two periodic signals;
updating, according to information of the pilot signal, content corresponding to the subcarrier used for loading the pilot signal; and
performing inverse discrete Fourier transform, parallel-to-serial conversion, digital-to-analog conversion, and electrical amplification processing on content currently corresponding to all the subcarriers of the OFDM signal, and modulating a light wave by using processed data and a bias electrical signal, to form an OFDM optical signal loaded with the pilot signal, wherein a high-order harmonic wave component of the periodic signal formed by superimposition of the at least two periodic signals is smaller than a high-order harmonic wave component of any periodic signal in the at least two periodic signals.

5. The method according to claim 4, wherein the at least two periodic signals are a square wave signal and a triangular wave signal.

6. A method for modulating an orthogonal frequency division multiplexing optical signal, the method comprising:
performing bit-to-symbol mapping on a baseband signal to obtain a symbol sequence of the baseband signal;
performing serial-to-parallel conversion on the symbol sequence to obtain at least two sub symbol sequences of the baseband signal, wherein each sub symbol sequence of the baseband signal corresponds to a subcarrier of an orthogonal frequency division multiplexing (OFDM) signal;
performing inverse discrete Fourier transform and parallel-to-serial conversion on all the sub symbol sequences of the baseband signal to obtain a service signal time domain sequence of the baseband signal;
determining, from all subcarriers of the OFDM signal, a subcarrier used for loading a pilot signal, wherein content corresponding to the subcarrier used for loading the pilot signal comprises content from an output of the parallel-to-serial conversion;
determining a waveform value sequence of the pilot signal according to information of the pilot signal;
updating, according to the information of the pilot signal, content corresponding to the subcarrier used for loading the pilot signal by superimposing the waveform value sequence of the pilot signal on the service signal time domain sequence, or by obtaining a product of the service signal time domain sequence and the waveform value sequence of the pilot signal, obtaining a loaded sequence, and superimposing the loaded sequence on the service signal time domain sequence; and
performing digital-to-analog conversion and electrical amplification processing on content currently corresponding to all the subcarriers of the OFDM signal, and modulating a light wave by using processed data and a bias electrical signal, to form an OFDM optical signal loaded with the pilot signal.

7. A method for modulating an orthogonal frequency division multiplexing optical signal, the method comprising:
performing bit-to-symbol mapping on a baseband signal to obtain a symbol sequence of the baseband signal;
performing serial-to-parallel conversion on the symbol sequence to obtain at least two sub symbol sequences of the baseband signal, wherein each sub symbol sequence of the baseband signal corresponds to a subcarrier of an orthogonal frequency division multiplexing (OFDM) signal;
performing inverse discrete Fourier transform and parallel-to-serial conversion on all the sub symbol sequences of the baseband signal to obtain a service signal time domain sequence of the baseband signal;
determining, from all subcarriers of the OFDM signal, a subcarrier used for loading a pilot signal, wherein the pilot signal is a periodic signal formed by superimposition of at least two periodic signals, and a high-order harmonic wave component of the periodic signal formed by superimposition of the at least two periodic signals is smaller than a high-order harmonic wave component of any periodic signal in the at least two periodic signals;
updating, according to information of the pilot signal, content corresponding to the subcarrier used for loading the pilot signal; and
performing digital-to-analog conversion and electrical amplification processing on content currently corresponding to all the subcarriers of the OFDM signal, and modulating a light wave by using processed data and a bias electrical signal, to form an OFDM optical signal loaded with the pilot signal.

8. The method according to claim 7, wherein the at least two periodic signals are a square wave signal and a triangular wave signal.

9. A device for modulating an orthogonal frequency division multiplexing optical signal, the device comprising:
a first digital signal processor configured to:
perform bit-to-symbol mapping on a baseband signal to obtain a symbol sequence of the baseband signal,
perform serial-to-parallel conversion on the symbol sequence to obtain at least two sub symbol sequences of the baseband signal, wherein each sub symbol sequence of the baseband signal corresponds to a subcarrier of an orthogonal frequency division multiplexing (OFDM) signal,
determine, from all subcarriers of the OFDM signal, a subcarrier used for loading a pilot signal, wherein content corresponding to the subcarrier used for loading the pilot signal comprises a sub symbol sequence of the baseband signal,
determine a symbol sequence of the pilot signal according to information of the pilot signal, wherein the symbol sequence of the pilot signal is a discrete periodic sequence,
update, according to the information of the pilot signal, content corresponding to the subcarrier used for loading the pilot signal by replacing the sub symbol sequence of the baseband signal with the symbol sequence of the pilot signal, and
perform inverse discrete Fourier transform and parallel-to-serial conversion on content currently corresponding to all the subcarriers of the OFDM signal;
a digital-to-analog converter configured to perform digital-to-analog conversion on data processed by the first digital signal processor;
an electrical amplifier configured to perform electrical amplification processing on data processed by the digital-to-analog converter; and
a modulator configured to modulate data processed by the electrical amplifier with a bias electrical signal and a light wave, to form an OFDM optical signal loaded with the pilot signal.

10. The device according to claim 9, wherein the first digital signal processor is configured to:

determine a frequency of the pilot signal according to the information of the pilot signal, and determine a frequency of the subcarrier used for loading the pilot signal; and determine the symbol sequence of the pilot signal according to a relationship between the frequency of the pilot signal and the frequency of the subcarrier used for loading the pilot signal.

11. A device for modulating an orthogonal frequency division multiplexing optical signal, the device comprising:
a first digital signal processor configured to:
perform bit-to-symbol mapping on a baseband signal to obtain a symbol sequence of the baseband signal,
perform serial-to-parallel conversion on the symbol sequence to obtain at least two sub symbol sequences of the baseband signal, wherein each sub symbol sequence of the baseband signal corresponds to a subcarrier of an orthogonal frequency division multiplexing (OFDM) signal,
determine, from all subcarriers of the OFDM signal, a subcarrier used for loading a pilot signal,
determine a frequency of the pilot signal according to information of the pilot signal, and determine a frequency of the subcarrier used for loading the pilot signal; and
determine the symbol sequence of the pilot signal according to a relationship between the frequency of the pilot signal and the frequency of the subcarrier used for loading the pilot signal by:
determining a symbol sequence obtained by performing Hilbert transform on the pilot signal as the symbol sequence of the pilot signal when the frequency of the pilot signal is higher than the frequency of the subcarrier used for loading the pilot signal; or
determining a conjugate sequence of a symbol sequence obtained by performing Hilbert transform on the pilot signal as the symbol sequence of the pilot signal when the frequency of the pilot signal is lower than the frequency of the subcarrier used for loading the pilot signal; or
determining a preset constant sequence as the symbol sequence of the pilot signal when the frequency of the pilot signal is equal to the frequency of the subcarrier used for loading the pilot signal,
update, according to the information of the pilot signal, content corresponding to the subcarrier used for loading the pilot signal, and
perform inverse discrete Fourier transform and parallel-to-serial conversion on content currently corresponding to all the subcarriers of the OFDM signal;
a digital-to-analog converter configured to perforin digital-to-analog conversion on data processed by the first digital signal processor;
an electrical amplifier configured to perform electrical amplification processing on data processed by the digital-to-analog converter; and
a modulator configured to modulate data processed by the electrical amplifier with a bias electrical signal and a light wave, to form an OFDM optical signal loaded with the pilot signal.

12. A device for modulating an orthogonal frequency division multiplexing optical signal, the device comprising:
a first digital signal processor configured to:
perform bit-to-symbol mapping on a baseband signal to obtain a symbol sequence of the baseband signal,
perform serial-to-parallel conversion on the symbol sequence to obtain at least two sub symbol sequences of the baseband signal, wherein each sub symbol sequence of the baseband signal corresponds to a subcarrier of an orthogonal frequency division multiplexing (OFDM) signal,
determine, from all subcarriers of the OFDM signal, a subcarrier used for loading a pilot signal, wherein the pilot signal is a periodic signal formed by superimposition of at least two periodic signals,
update, according to information of the pilot signal, content corresponding to the subcarrier used for loading the pilot signal, and
perform inverse discrete Fourier transform and parallel-to-serial conversion on content currently corresponding to all the subcarriers of the OFDM signal;
a digital-to-analog converter configured to perform digital-to-analog conversion on data processed by the first digital signal processor;
an electrical amplifier configured to perform electrical amplification processing on data processed by the digital-to-analog converter; and
a modulator configured to modulate data processed by the electrical amplifier with a bias electrical signal and a light wave, to form an OFDM optical signal loaded with the pilot signal, wherein a high-order harmonic wave component of the periodic signal formed by superimposition of the at least two periodic signals is smaller than a high-order harmonic wave component of any periodic signal in the at least two periodic signals.

13. The device according to claim 12, wherein the at least two periodic signals are a square wave signal and a triangular wave signal.

14. A device for modulating an orthogonal frequency division multiplexing optical signal, the device comprising:
a digital signal processor configured to:
perform bit-to-symbol mapping on a baseband signal to obtain a symbol sequence of the baseband signal,
perform serial-to-parallel conversion on the symbol sequence to obtain at least two sub symbol sequences of the baseband signal, wherein each sub symbol sequence of the baseband signal corresponds to a subcarrier of an orthogonal frequency division multiplexing (OFDM) signal,
perform inverse discrete Fourier transform and parallel-to-serial conversion on all the sub symbol sequences of the baseband signal to obtain a service signal time domain sequence of the baseband signal,
determine, from all subcarriers of the OFDM signal, a subcarrier used for loading a pilot signal, wherein content corresponding to the subcarrier used for loading the pilot signal comprises content from an output of the parallel-to-serial conversion,
determine a waveform value sequence of the pilot signal according to information of the pilot signal, and
update, according to the information of the pilot signal, content corresponding to the subcarrier used for loading the pilot signal, by superimposing the waveform value sequence of the pilot signal on the service signal time domain sequence; or by obtaining a product of the service signal time domain sequence and the waveform value sequence of the pilot signal, obtaining a loaded sequence, and superimposing the loaded sequence on the service signal time domain sequence;

a digital-to-analog converter configured to perforin digital-to-analog conversion on data processed by the digital signal processor;

an electrical amplifier configured to perform electrical amplification processing on data processed by the digital-to-analog converter; and a modulator configured to modulate data processed by the electrical amplifier with a bias electrical signal and a light wave, to form an OFDM optical signal loaded with the pilot signal.

15. The device according to claim 14, wherein the pilot signal is a periodic signal formed by superimposition of at least two periodic signals, and a high-order harmonic wave component of the periodic signal formed by superimposition of the at least two periodic signals is smaller than a high-order harmonic wave component of any periodic signal in the at least two periodic signals.

16. The device according to claim 15, wherein the at least two periodic signals are a square wave signal and a triangular wave signal.

* * * * *